US012724513B2

(12) United States Patent
Lee et al.

(10) Patent No.: US 12,724,513 B2
(45) **Date of Patent: *Sep. 1, 2026**

(54) TOUCH SENSING DEVICE AND TOUCH SENSING METHOD

(71) Applicant: LX SEMICON CO., LTD., Daejeon (KR)

(72) Inventors: Young Eun Lee, Daejeon (KR); Gyu Min Gil, Daejeon (KR)

(73) Assignee: LX SEMICON CO., LTD., Daejeon (KR)

(*) Notice: Subject to any disclaimer, the term of this patent is extended or adjusted under 35 U.S.C. 154(b) by 170 days.

This patent is subject to a terminal disclaimer.

(21) Appl. No.: 18/716,040

(22) PCT Filed: Nov. 21, 2022

(86) PCT No.: PCT/KR2022/018383

§ 371 (c)(1),
(2) Date: Jun. 3, 2024

(87) PCT Pub. No.: WO2023/101286

PCT Pub. Date: Jun. 8, 2023

(65) Prior Publication Data

US 2026/0169587 A1 Jun. 18, 2026

(30) Foreign Application Priority Data

Dec. 3, 2021 (KR) ........................ 10-2021-0171443

(51) Int. Cl.
*G06F 3/041* (2006.01)
*G06F 3/044* (2006.01)

(52) U.S. Cl.
CPC ...... *G06F 3/0418* (2013.01); *G06F 3/041662* (2019.05); *G06F 3/0443* (2019.05); *G06F 3/0446* (2019.05)

(58) Field of Classification Search
CPC ............. G06F 3/0418; G06F 3/041662; G06F 3/0443; G06F 3/0446
See application file for complete search history.

(56) References Cited

U.S. PATENT DOCUMENTS 12,050,750 B2 * 7/2024 Lee ...................... G06F 3/0443
2013/0038570 A1 2/2013 Seo et al.
(Continued)

FOREIGN PATENT DOCUMENTS

JP 2012-088899 A 5/2012
JP 2015-184888 A 10/2015
(Continued)

OTHER PUBLICATIONS

Office Action issued in corresponding Korean Patent Application No. 10-2021-0171443 dated Nov. 24, 2025, (19 pages).
(Continued)

*Primary Examiner* — Antonio Xavier
(74) *Attorney, Agent, or Firm* — ROTHWELL, FIGG, ERNST & MANBECK, P.C.

(57) ABSTRACT

An embodiment of the present invention relates to a touch sensing device which drives a touch screen panel comprising: a touch driving electrode extending in a first direction; and a touch sensing electrode extending in a second direction perpendicular to the first direction. The touch sensing device comprises: a first driving unit and a second driving unit, which are driven in at least one among a mutual sensing mode, a first self-sensing mode, and a second self-sensing mode; and a control unit for determining a touch situation on the basis of a mutual sensing signal, which is input according to the mutual sensing mode, to drive the first driving unit and the second driving unit in the first self-sensing mode or the second self-sensing mode.

15 Claims, 15 Drawing Sheets

(56) References Cited

U.S. PATENT DOCUMENTS

| | | | | |
|---|---|---|---|---|
| 2013/0154965 | A1* | 6/2013 | Hwang | G06F 3/0446 345/173 |
| 2014/0204058 | A1* | 7/2014 | Huang | G06F 3/0446 345/174 |
| 2016/0253041 | A1 | 9/2016 | Park et al. | |

FOREIGN PATENT DOCUMENTS

| | | | |
|---|---|---|---|
| JP | 2019-074973 | A | 5/2019 |
| JP | 2019-159765 | A | 9/2019 |
| KR | 10-2014-0081260 | A | 7/2014 |
| KR | 10-2016-0087467 | A | 7/2016 |
| KR | 10-2020-0140434 | A | 12/2020 |
| KR | 10-2021-0079086 | A | 6/2021 |
| KR | 10-2021-0086243 | A | 7/2021 |

OTHER PUBLICATIONS

International Search Report issued for International Application No. PCT/KR2022/018383 on Feb. 28, 2023, 4 pages.

Extended European Search Report dated Aug. 4, 2025, issued for the corresponding European patent application No. EP22901644.9, 7 pages.

* cited by examiner

[FIG. 1]
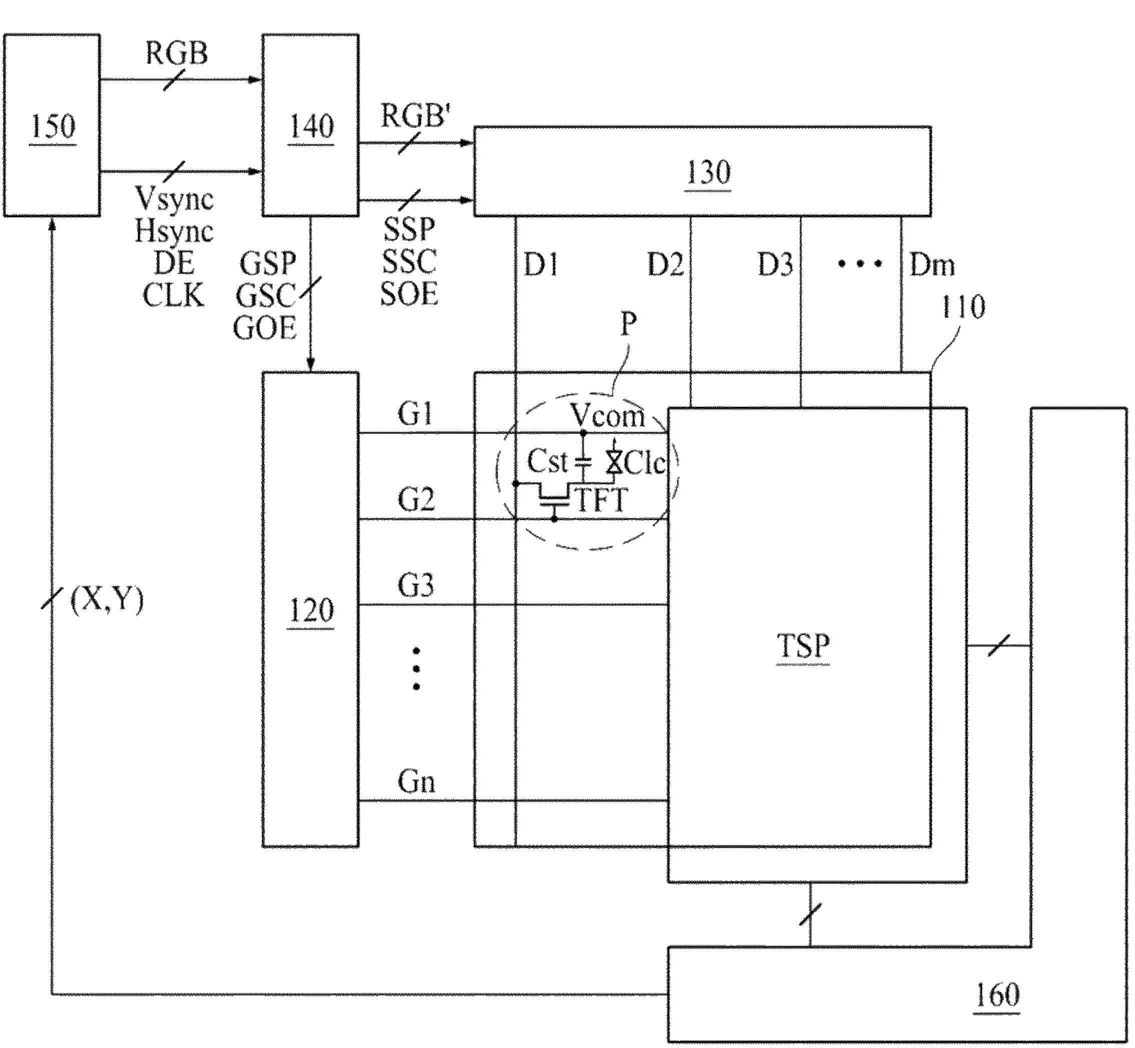

[FIG. 2]
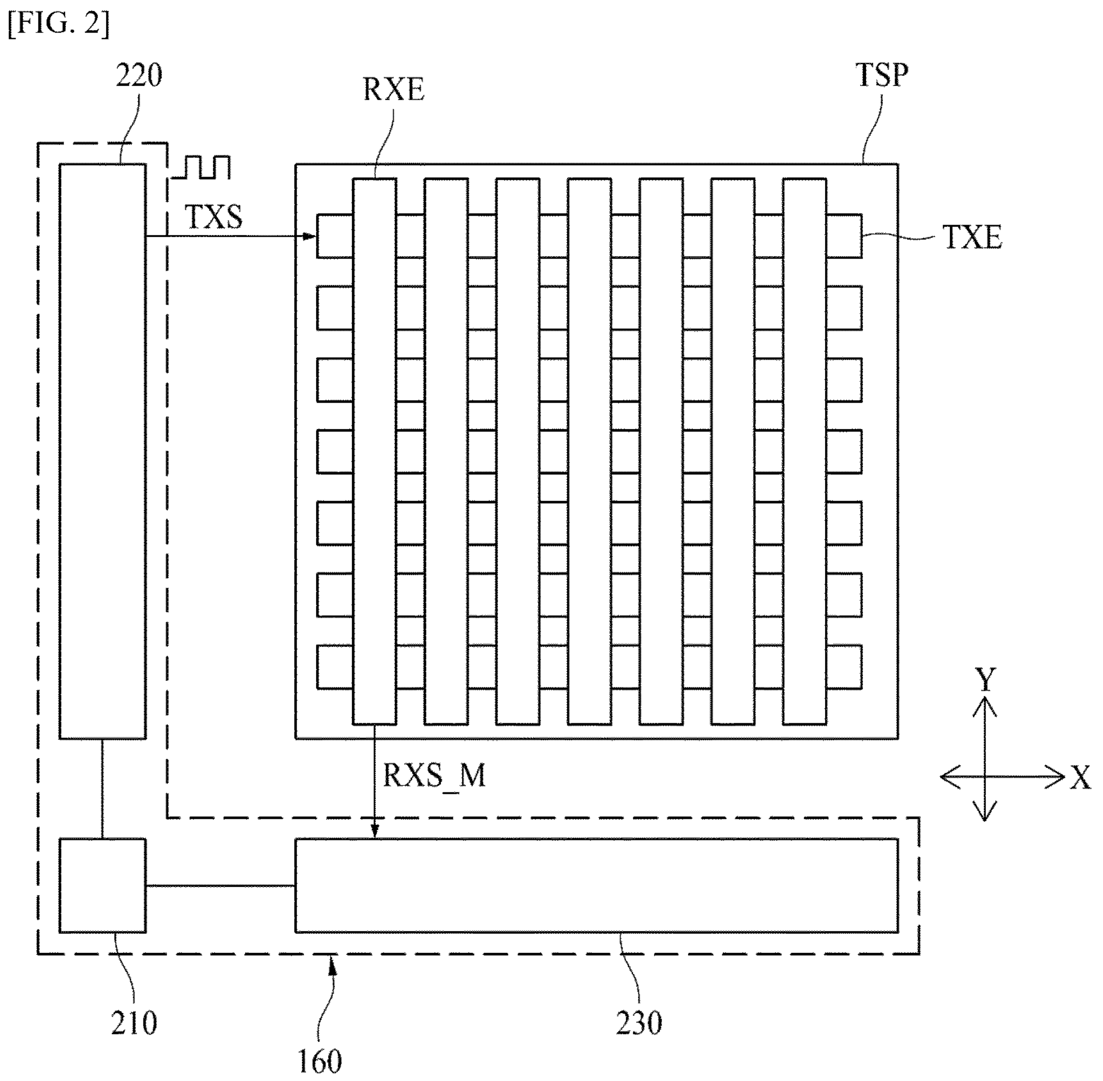

[FIG. 3]
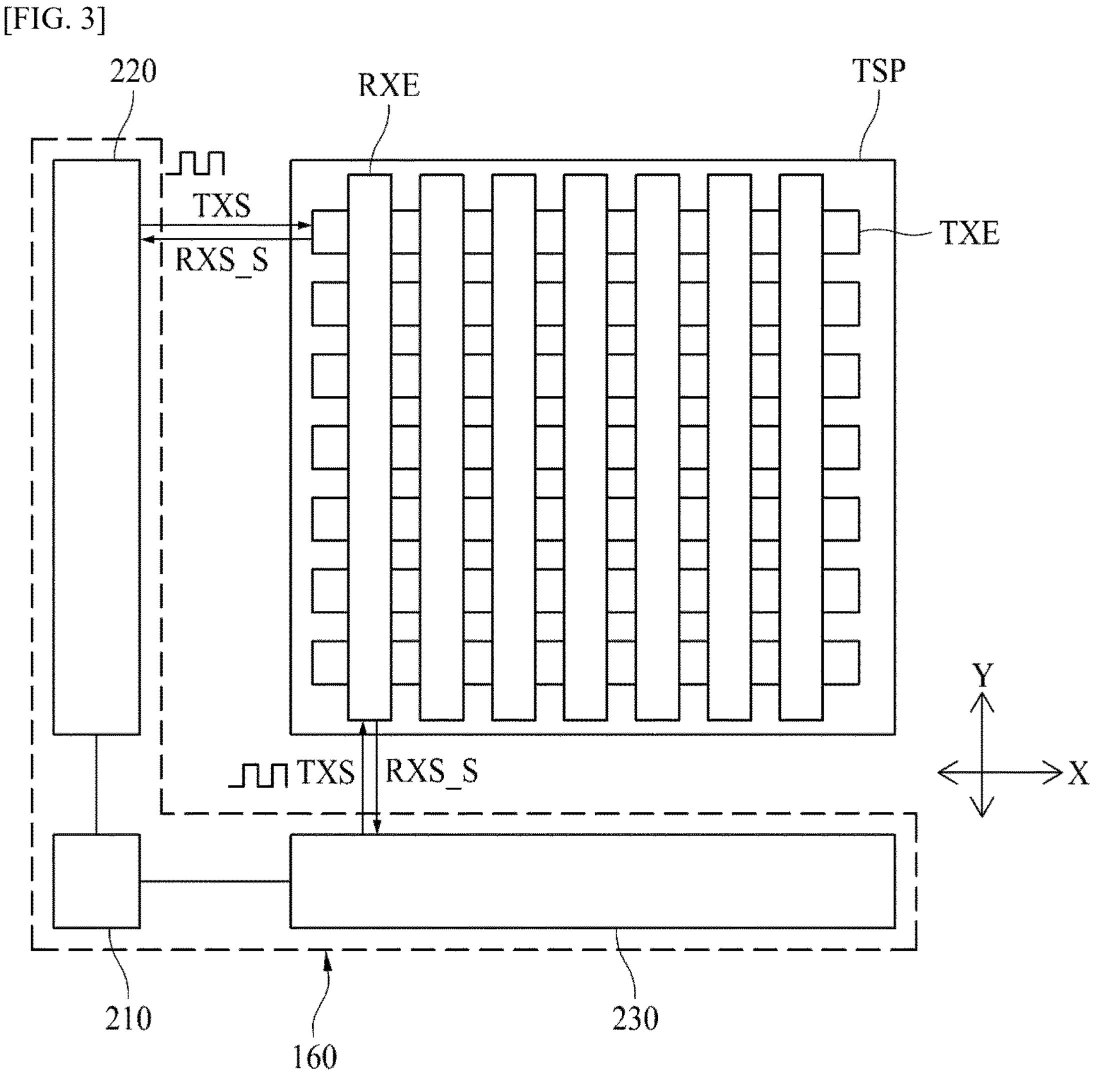

[FIG. 4]
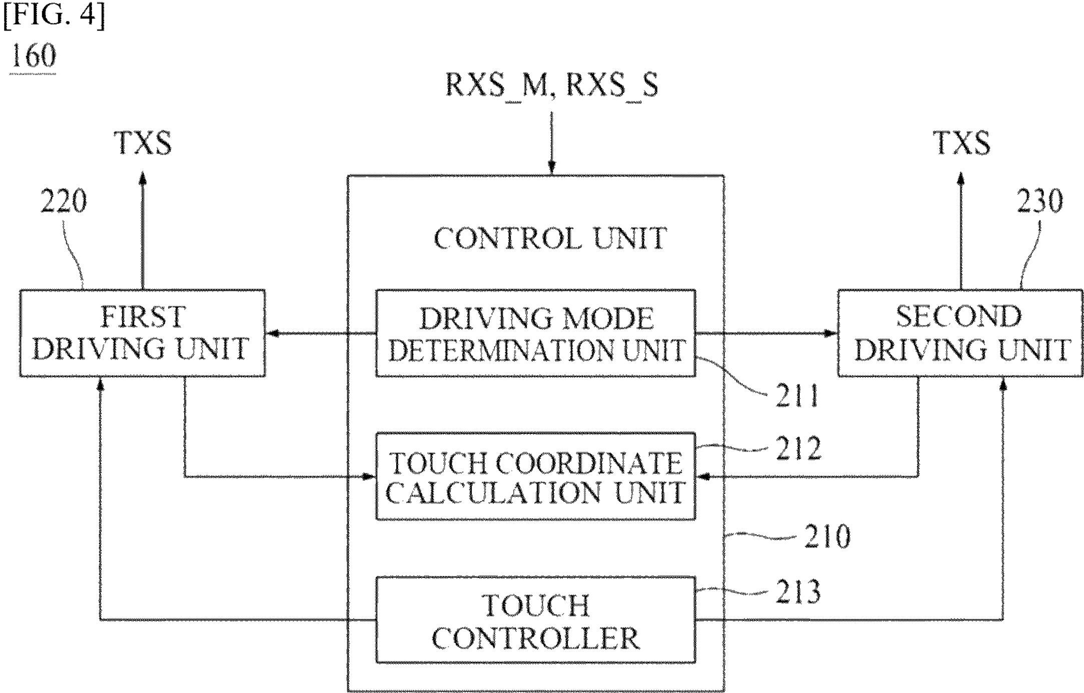

[FIG. 5]
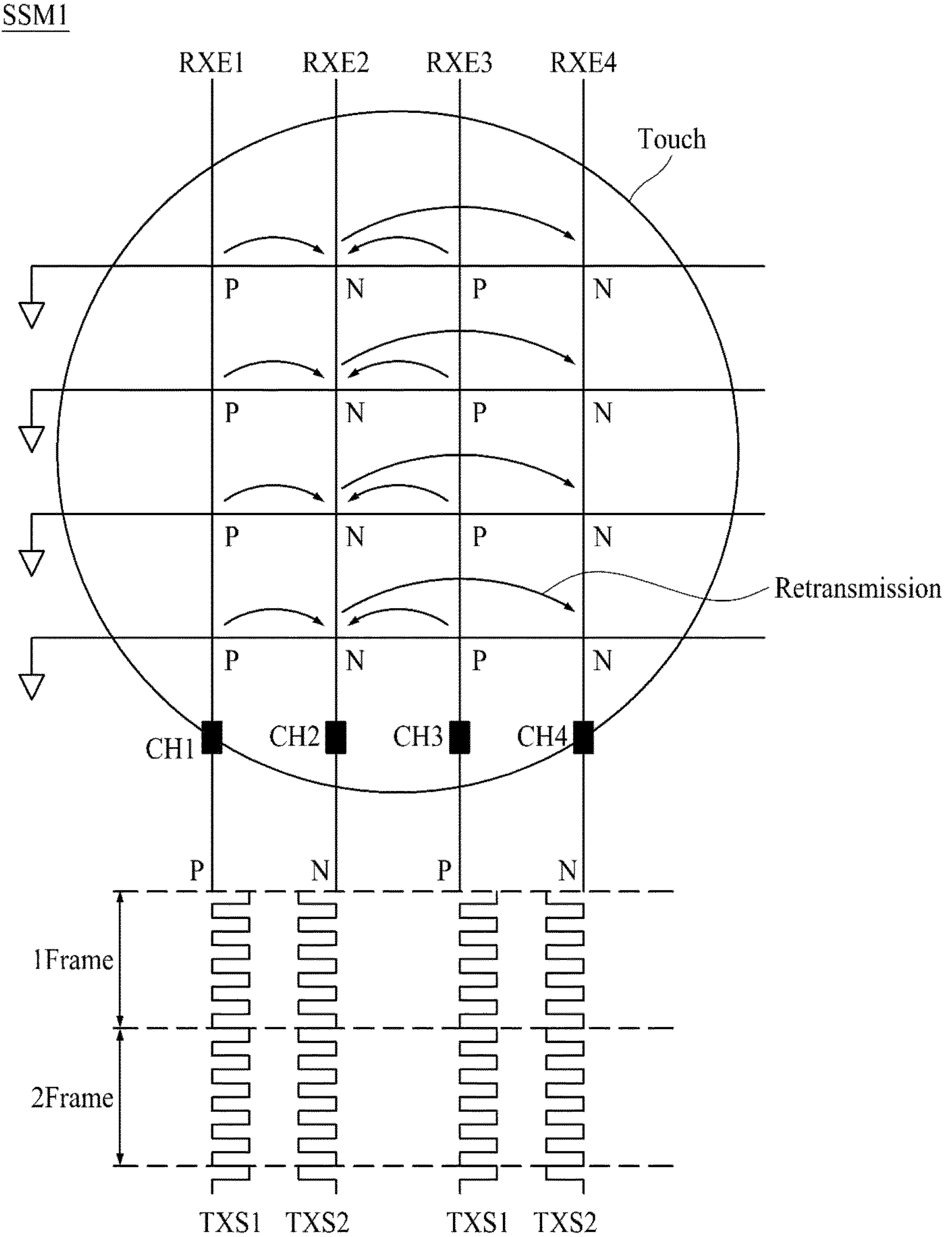

[FIG. 6A]
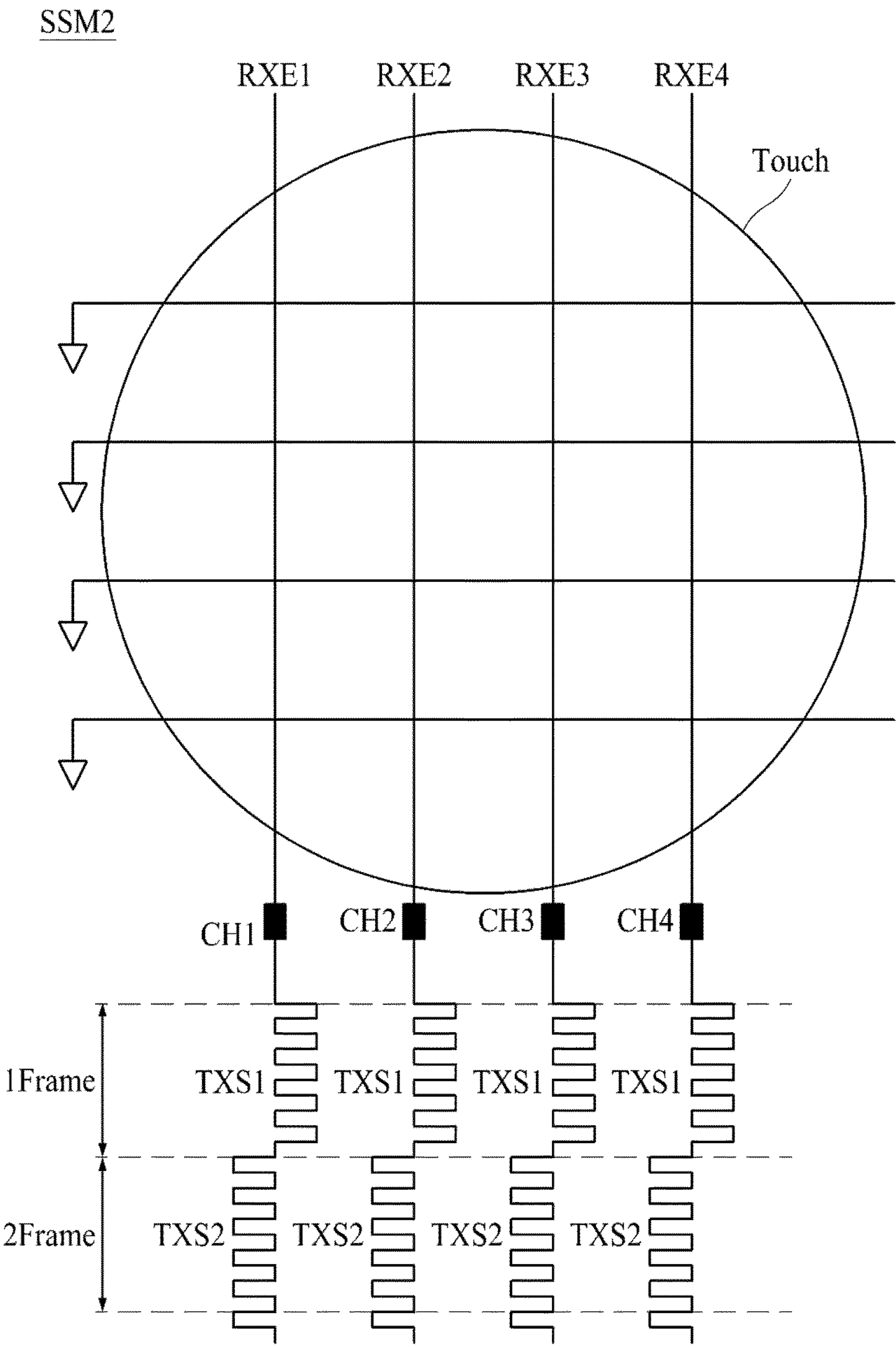

[FIG. 6B]
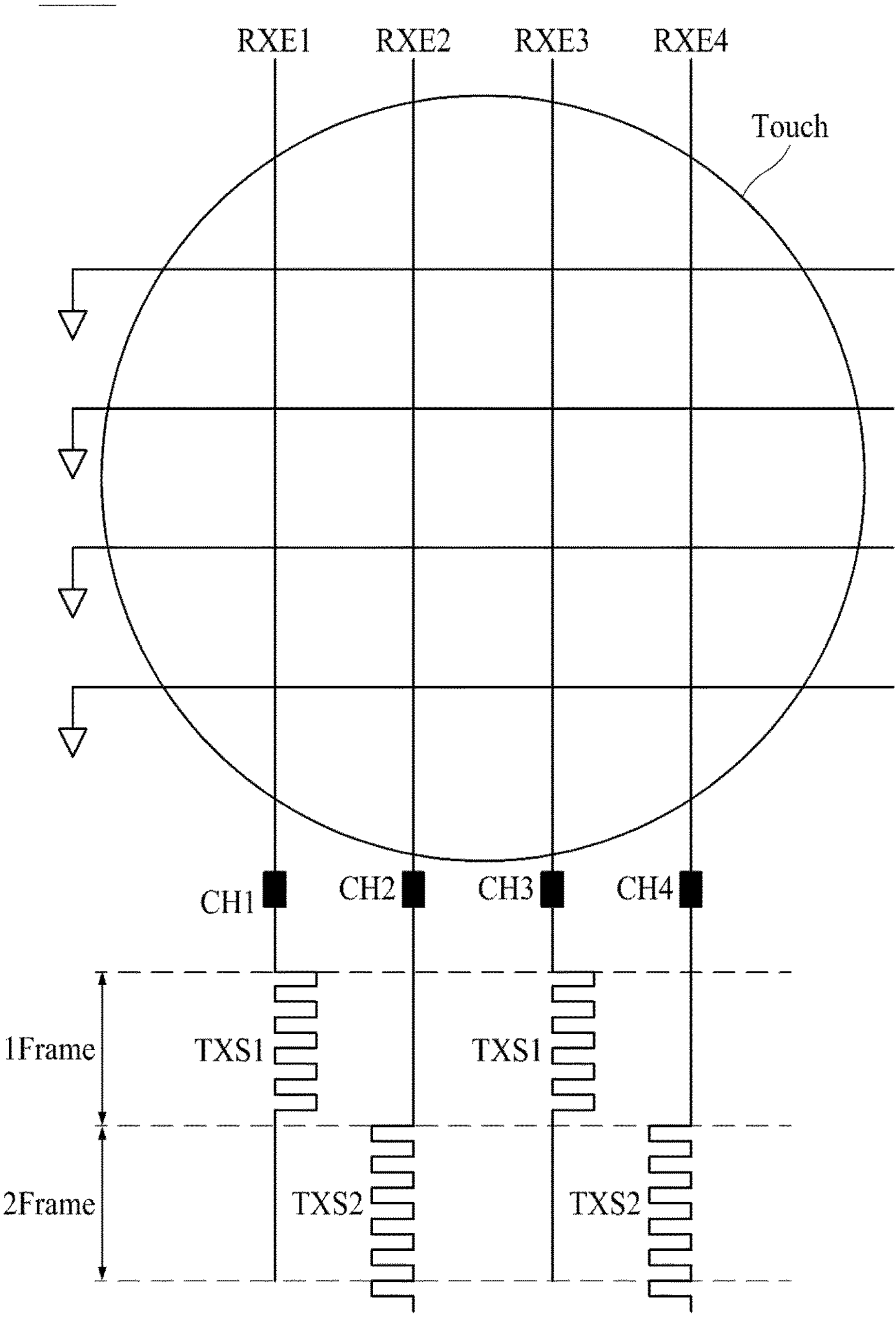

| | Rx0 | Rx1 | Rx2 | Rx3 | Rx4 | Rx5 | Rx6 | Rx7 | Rx8 | Rx9 | Rx10 | Rx11 | Rx12 | Rx13 | Rx14 | Rx15 | Rx16 | Rx17 | Rx18 | Rx19 | • • • Rxn |
|---|---|---|---|---|---|---|---|---|---|---|---|---|---|---|---|---|---|---|---|---|---|
| Tx0 | 0 | 0 | 0 | 0 | 1 | 0 | -1 | -1 | -1 | -1 | 0 | -1 | -1 | -1 | 0 | -1 | -2 | -1 | -2 | -1 | |
| Tx1 | 1 | 0 | 0 | 0 | 0 | 0 | 0 | -1 | 0 | 0 | 0 | -1 | -1 | 0 | -1 | -1 | -1 | 0 | 0 | -1 | |
| Tx2 | 0 | 0 | 0 | 0 | 0 | 0 | -1 | 0 | 1 | -2 | 1 | -1 | 0 | -1 | 0 | 0 | 0 | 0 | -1 | 0 | |
| Tx3 | 0 | -1 | 0 | -1 | -1 | 0 | -1 | 0 | 0 | 0 | -1 | 1 | 0 | -1 | 1 | -1 | 1 | 0 | 1 | -1 | |
| Tx4 | 0 | 0 | 0 | 0 | 0 | 0 | 0 | -1 | 0 | -1 | -1 | 1 | -1 | -1 | 3 | -7 | 1 | -1 | -2 | 0 | |
| Tx5 | 0 | -1 | 1 | -1 | 1 | -1 | 0 | 0 | -1 | 1 | 0 | -47 | 11 | -1 | 3 | -8 | 18 | 0 | 0 | -2 | |
| Tx6 | -1 | 0 | 0 | 0 | 0 | -1 | 0 | 0 | 1 | -2 | 1 | -3 | -21 | -17 | -5 | -1 | -4 | -4 | -30 | -2 | |
| Tx7 | 0 | 0 | 0 | -1 | -1 | 2 | -2 | -1 | 3 | -4 | 1 | -1 | 0 | 3 | 4 | -3 | -1 | -37 | 4 | 1 | |
| Tx8 | 0 | 0 | 0 | -1 | 3 | 1 | -6 | 3 | -8 | 2 | 1 | 0 | -4 | 1 | -3 | 1 | 0 | -1 | -1 | -2 | |
| Tx9 | 0 | 0 | 0 | 0 | 2 | -2 | 5 | -11 | 0 | 0 | -1 | 4 | 0 | -10 | 3 | -3 | 0 | 0 | 0 | -1 | • • • |
| Tx10 | 0 | 0 | 0 | 0 | 0 | 3 | -81 | 6 | 1 | 26 | 0 | 21 | 1 | 4 | 20 | 30 | -2 | -3 | -1 | -1 | |
| Tx11 | -1 | -1 | 0 | 1 | 1 | 2 | 1 | 17 | 33 | -52 | -30 | -12 | 2 | -2 | 2 | -26 | -2 | -5 | 0 | 0 | |
| Tx12 | 0 | 0 | 0 | -1 | 0 | -29 | 35 | 5 | -2 | 3 | 16 | 5 | 4 | -2 | 0 | -1 | 0 | 0 | -1 | 1 | |
| Tx13 | 1 | -1 | 1 | 1 | 0 | 1 | -1 | 1 | -1 | 3 | 5 | -5 | -3 | -1 | 3 | -4 | 1 | -3 | -2 | -1 | |
| Tx14 | 0 | -1 | 1 | 0 | 0 | 0 | -1 | -1 | 0 | 0 | 0 | 1 | 0 | -2 | -4 | -1 | -1 | -2 | 0 | -1 | |
| Tx15 | 0 | 0 | 0 | 1 | 0 | 0 | 0 | 0 | 0 | 0 | 0 | -2 | 2 | -2 | 0 | -1 | -1 | 1 | -1 | 1 | |
| Tx16 | -1 | 0 | -1 | 0 | 1 | -1 | -1 | -1 | 0 | 0 | -1 | 1 | 0 | -1 | 1 | -1 | 1 | 1 | 1 | 0 | |
| Tx17 | -1 | 0 | 1 | -1 | 0 | 0 | -1 | 1 | -2 | 0 | -1 | 1 | -1 | 0 | 0 | 0 | -1 | 0 | 0 | 0 | |
| Tx18 | -1 | 0 | -1 | -1 | 0 | 0 | -2 | 1 | -1 | 0 | 0 | 0 | 0 | 1 | 0 | 1 | 1 | 1 | 0 | 0 | |
| ⋮ | | | | | | | | | | | ⋮ | | | | | | | | | | |
| Txn | | | | | | | | | | | | | | | | | | | | | |

| | Rx0 | Rx1 | Rx2 | Rx3 | Rx4 | Rx5 | Rx6 | Rx7 | Rx8 | Rx9 | Rx10 | Rx11 | Rx12 | Rx13 | Rx14 | Rx15 | Rx16 | Rx17 | Rx18 | Rx19 | • • • | Rxn |
|---|---|---|---|---|---|---|---|---|---|---|---|---|---|---|---|---|---|---|---|---|---|---|
| Tx0 | 0 | -1 | 0 | 0 | 0 | -1 | 0 | -1 | -1 | 0 | 0 | -1 | 0 | 0 | 0 | -2 | 0 | -1 | 0 | -1 | | |
| Tx1 | -1 | 0 | 0 | 1 | -1 | 0 | 0 | 0 | 0 | 0 | 0 | -1 | 0 | 0 | 0 | -1 | 0 | -1 | 0 | -1 | | |
| Tx2 | 0 | 0 | 0 | 0 | -1 | 1 | 0 | 0 | 1 | 0 | -2 | 1 | -1 | 1 | -2 | -2 | 2 | -3 | -1 | 0 | | |
| Tx3 | -1 | 0 | 0 | 1 | 1 | -1 | 0 | 4 | 1 | 15 | 46 | 2 | -2 | 0 | -5 | -2 | 0 | -1 | -1 | -1 | | |
| Tx4 | 0 | 0 | 0 | 0 | -1 | -1 | 1 | -99 | 100 | 80 | 25 | 35 | 57 | -84 | 1 | -1 | 0 | 0 | -1 | 0 | | |
| Tx5 | -1 | 0 | -1 | 0 | -1 | 1 | -1 | 25 | 3 | -2 | -86 | -86 | 19 | 1 | 4 | -2 | 1 | 0 | -1 | 0 | | |
| Tx6 | 1 | -2 | 1 | 0 | 0 | 0 | -2 | 66 | -50 | 3 | -82 | -95 | 11 | 81 | 9 | -1 | 0 | -2 | 0 | 0 | | |
| Tx7 | -1 | 0 | 0 | 0 | 0 | -1 | -2 | 38 | -71 | -98 | -25 | -47 | 2 | 70 | 10 | 0 | 0 | -1 | 0 | 0 | | |
| Tx8 | 0 | -1 | 0 | 1 | 0 | -1 | 1 | -1 | -30 | -61 | -10 | 89 | -24 | -10 | -4 | 1 | -2 | -1 | 0 | -1 | | |
| Tx9 | 1 | -1 | 2 | 0 | 0 | -2 | -1 | -90 | 79 | 49 | -3 | 47 | 56 | -67 | 6 | -2 | 1 | 0 | -1 | -1 | • • • | |
| Tx10 | 1 | 0 | -1 | 1 | -1 | -1 | 1 | 1 | 1 | -12 | -12 | 23 | 9 | -3 | -4 | -1 | 0 | -1 | -1 | 1 | | |
| Tx11 | -1 | 2 | 0 | 1 | -1 | 1 | -1 | -1 | 0 | 1 | 1 | 0 | -1 | 0 | -2 | -1 | -1 | -1 | 0 | -1 | | |
| Tx12 | -1 | -1 | 0 | 0 | -1 | 0 | -1 | 0 | -1 | 0 | 0 | 0 | -1 | 0 | 1 | -1 | -1 | 0 | -1 | 0 | | |
| Tx13 | -1 | 0 | 0 | 0 | 0 | -2 | -1 | 1 | 0 | 0 | 0 | 0 | -1 | 0 | -1 | -1 | -1 | 1 | 0 | 0 | | |
| Tx14 | 1 | -1 | 0 | 1 | -2 | 0 | 0 | -1 | 0 | 0 | 0 | -1 | 0 | 0 | -2 | 0 | -1 | 0 | -1 | 0 | | |
| Tx15 | 0 | 0 | 0 | 1 | 0 | 0 | 0 | -1 | 1 | -1 | 1 | -1 | 0 | 0 | -1 | -1 | 0 | 0 | 0 | 0 | | |
| Tx16 | -1 | 1 | 0 | 0 | -1 | 0 | 0 | 0 | 0 | 0 | 0 | 0 | -1 | 0 | 0 | -2 | 1 | 0 | 0 | 0 | | |
| Tx17 | 1 | -1 | 0 | 2 | -1 | 0 | -1 | 1 | 1 | -1 | 0 | -1 | -1 | 1 | -1 | -1 | -1 | 0 | -1 | -1 | | |
| Tx18 | 0 | -2 | 1 | 0 | 0 | -1 | 0 | 0 | -1 | 0 | 1 | -1 | -1 | 0 | 0 | -1 | 1 | -2 | 2 | -1 | | |
| ⋮ | | | | | | | | | | | ⋮ | | | | | | | | | | | |
| Txn | | | | | | | | | | | | | | | | | | | | | | |

[FIG. 7B]

[FIG. 8]
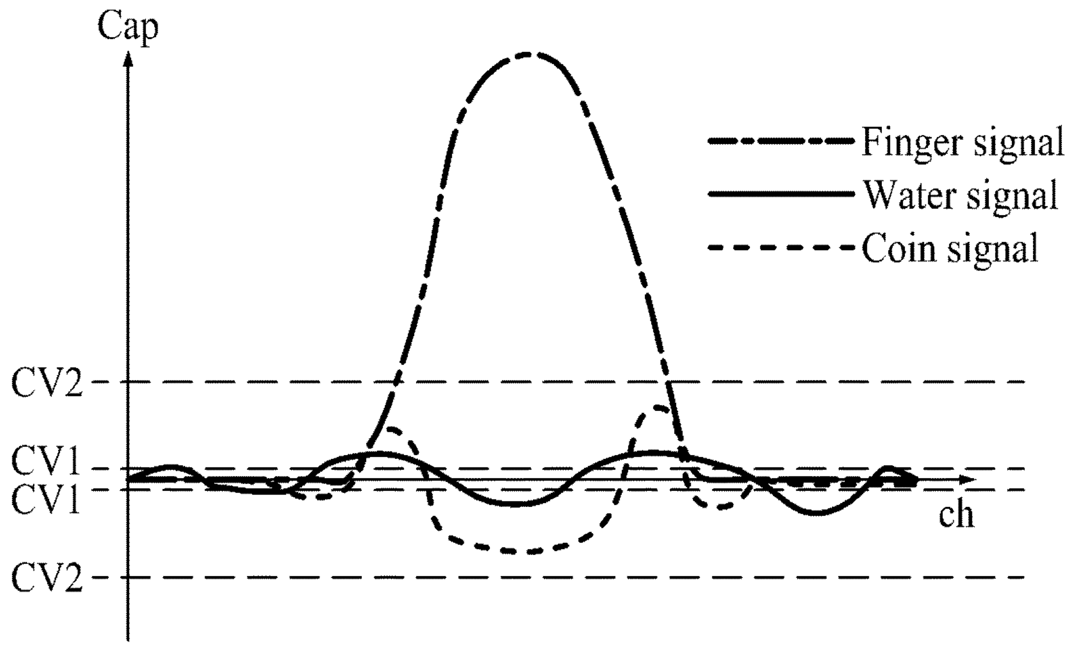

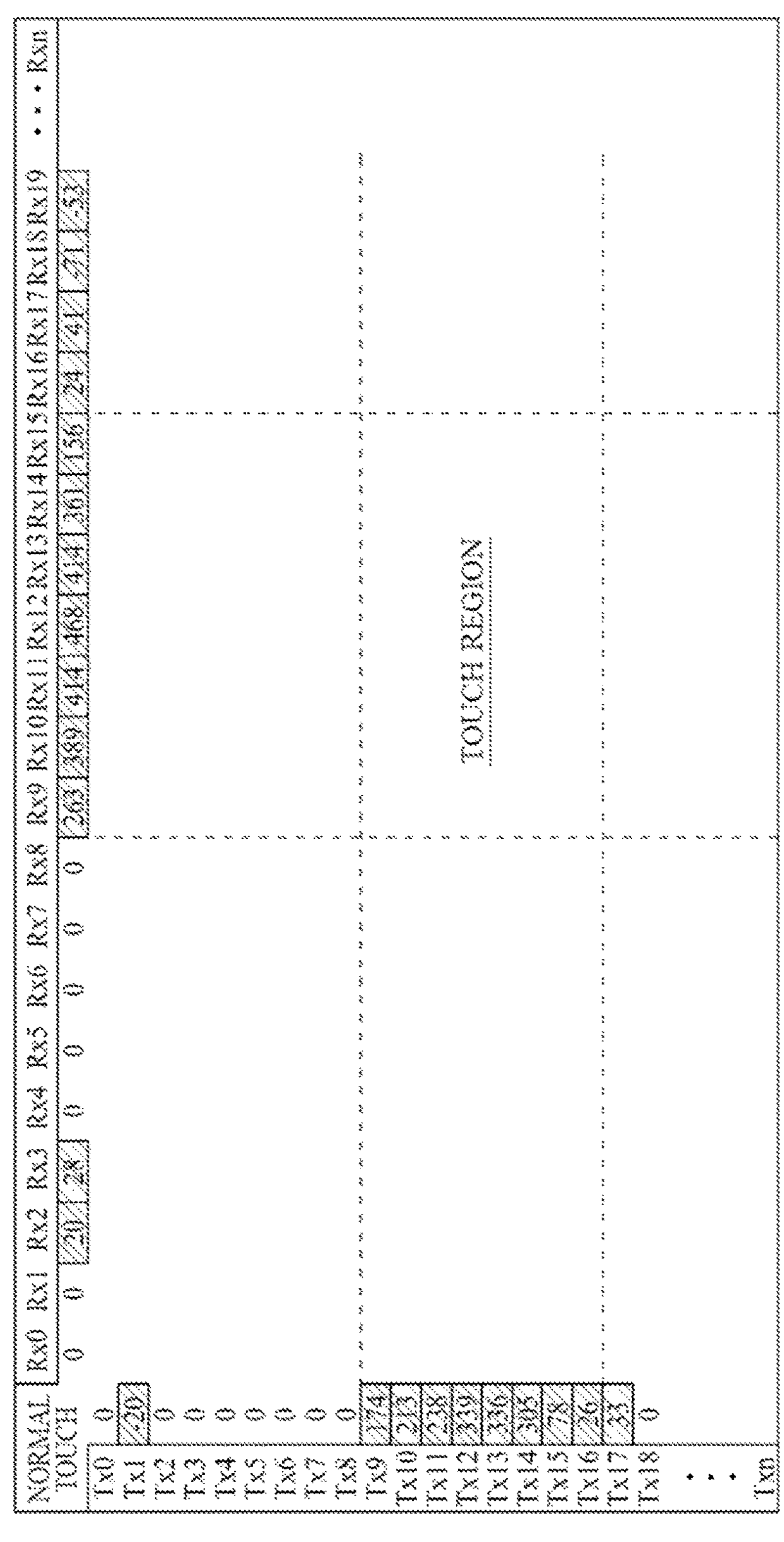
[FIG. 9A]

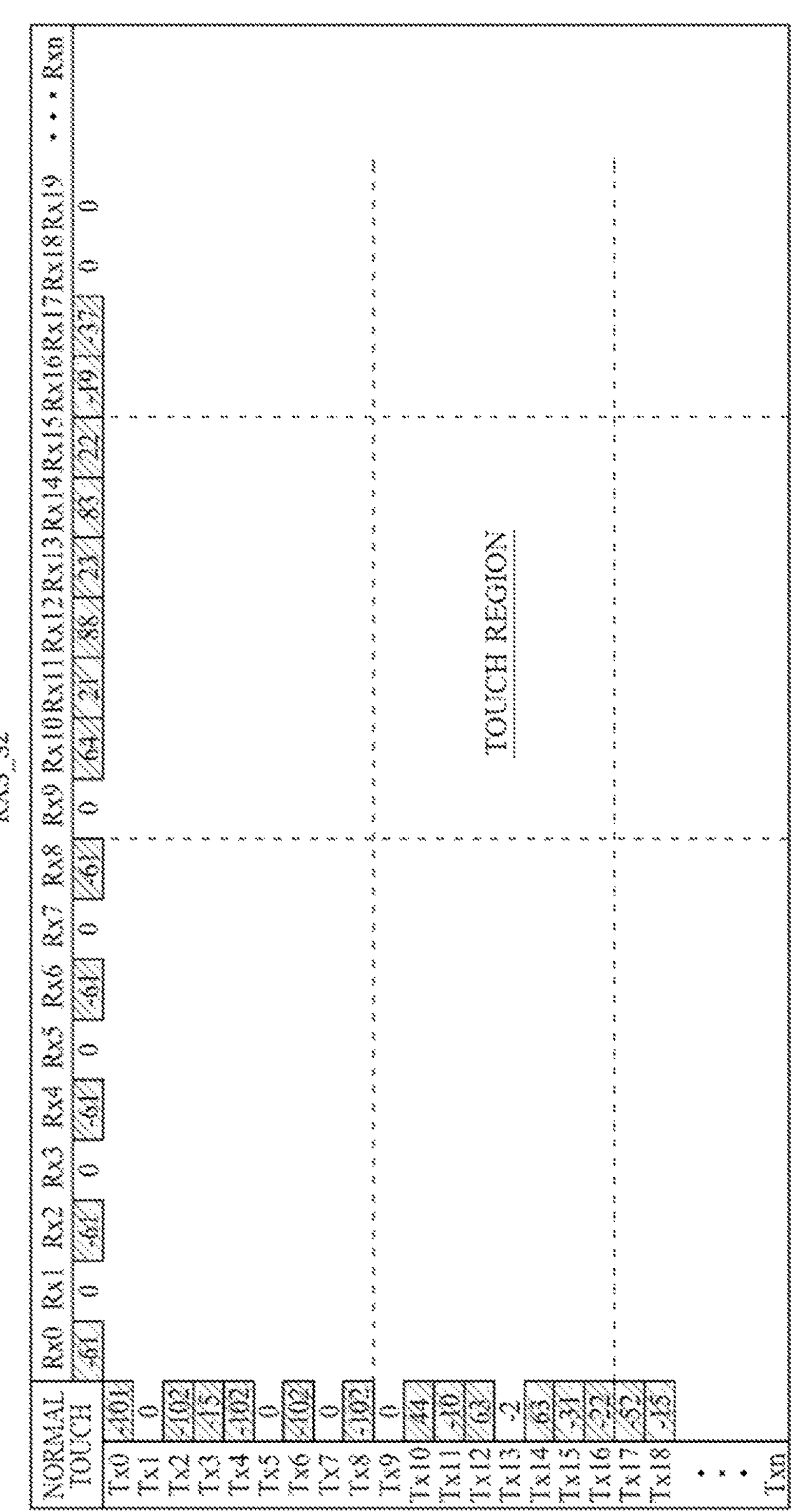
[FIG. 9B]

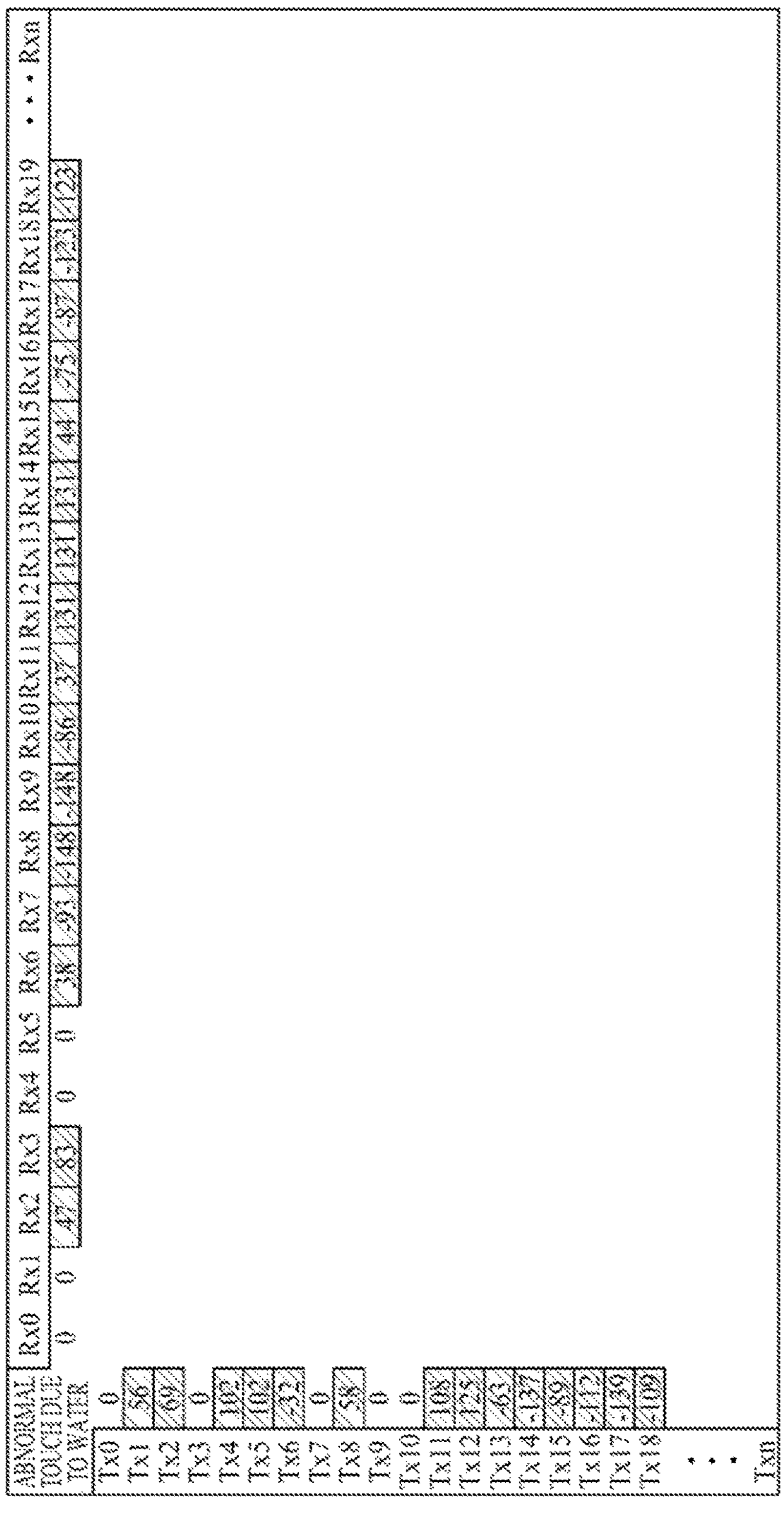
[FIG. 9C]

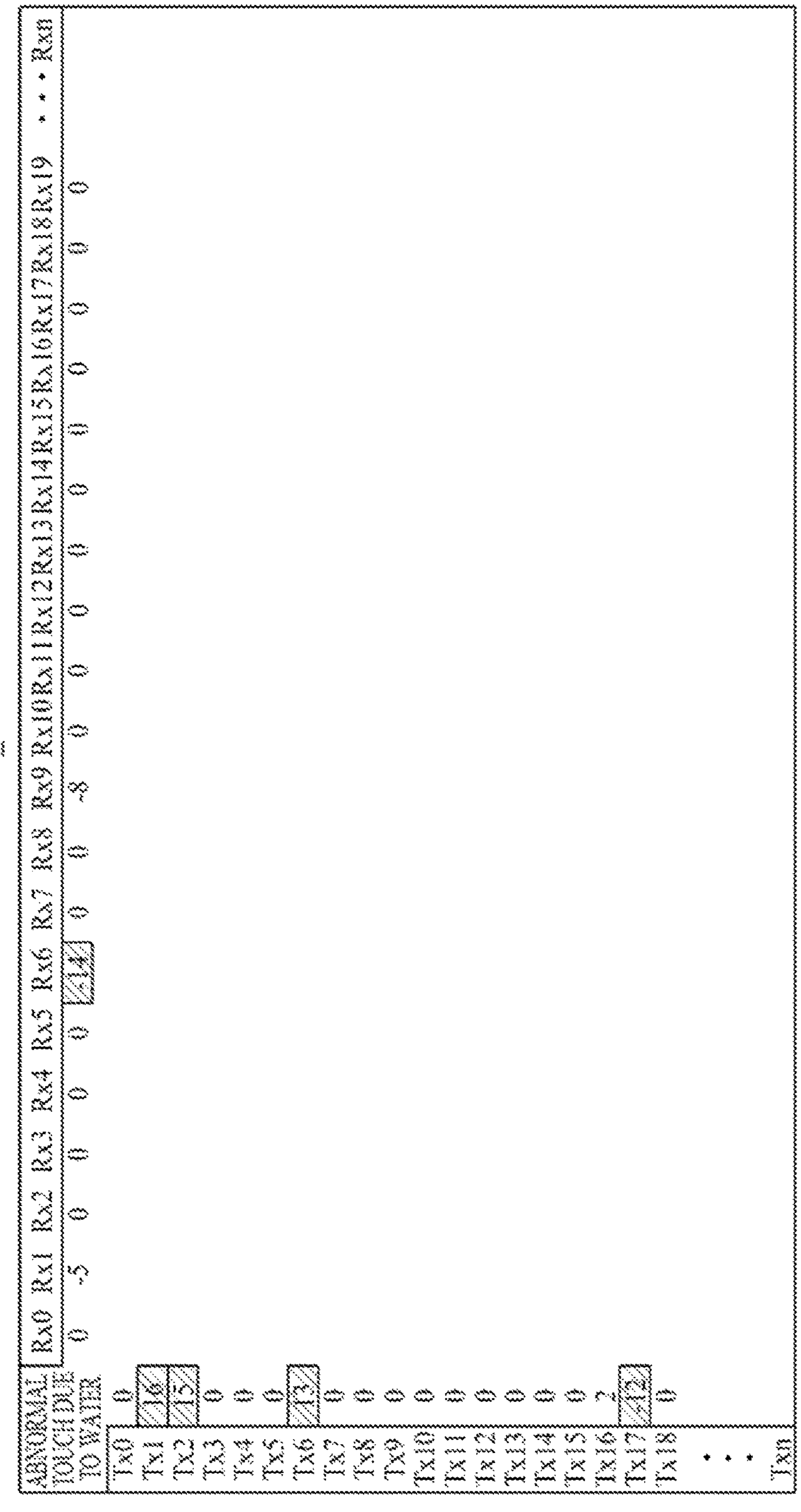
[FIG. 9D]

[FIG. 10]
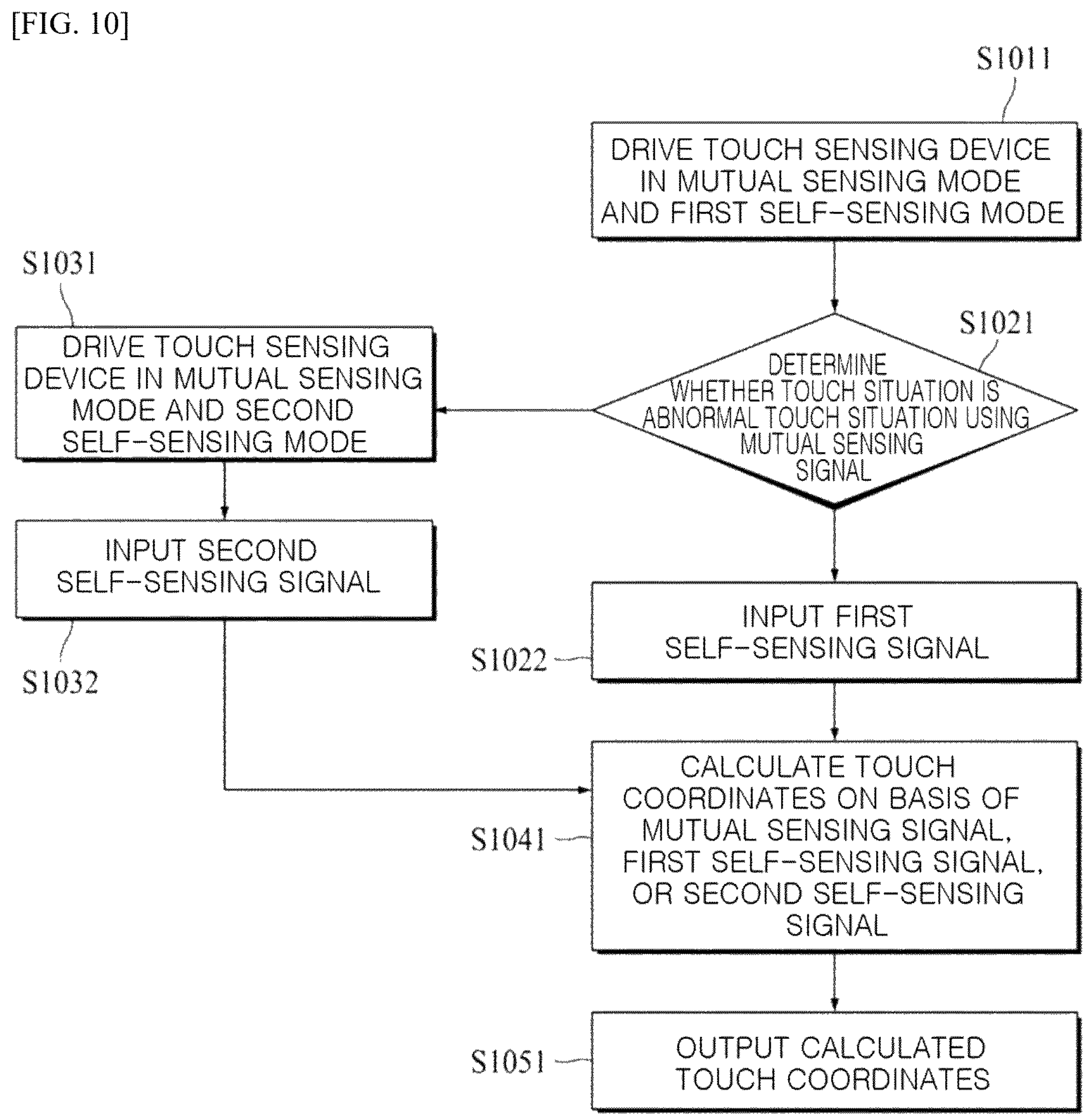

TOUCH SENSING DEVICE AND TOUCH SENSING METHOD

CROSS REFERENCE TO RELATED APPLICATION(S)

This application is a 35 U.S.C. § 371 National Phase Entry Application from PCT/KR2022/018383, filed on Nov. 21, 2022, which claims the benefit of Korean Patent Application No. 10-2021-0171443, filed on Dec. 3, 2021, the disclosures of which are herein incorporated by reference in their entirety.

TECHNICAL FIELD

The present invention relates to a touch sensing device and a touch sensing method.

BACKGROUND ART

As display devices for displaying images, liquid crystal displays (LCDs) using liquid crystals and organic light-emitting diode (OLED) displays using OLEDs are representative.

Recently, moving away from the typical input manners using buttons, keyboards, or mouses, display devices (hereinafter referred to as "touch display devices") having touch screen panels capable of detecting a touch input by a user's finger or a stylus pen are widely used. The above-described touch display devices include touch sensing devices.

That is, the touch display device may include a display driving device for driving a display device, and a touch sensing device for detecting the presence or absence of a touch and a touch coordinate (or a touch position). Specifically, the touch sensing device detects touch sensing data by driving touch sensors (or touch electrodes) and detects touch information including the presence or absence of a touch or a touch coordinate using the detected touch sensing data.

The touch display device receives a touch input using a capacitive scheme and can receive a touch input not only by a user but also by a conductive material such as water or a coin. However, malfunction of the touch display device can occur due to a touch input caused by a conductive material such as water or a coin that is not intended by a user.

DISCLOSURE

Technical Problem

The present invention is directed to providing a touch sensing device and a touch sensing method.

Technical Solution

One aspect of the present invention provides a touch sensing device, which drives a touch screen panel including a touch driving electrode extending in a first direction and a touch sensing electrode extending in a second direction perpendicular to the first direction, including a first driving unit and a second driving unit which are driven in at least one of a mutual sensing mode, a first self-sensing mode, and a second self-sensing mode; and a control unit configured to determine a touch situation on the basis of a mutual sensing signal input according to the mutual sensing mode and drive the first driving unit and the second driving unit in the first self-sensing mode or the second self-sensing mode, wherein, when a normal touch situation is determined by the control unit, the first driving unit and the second driving unit are driven in the first self-sensing mode and supply touch driving signals with different polarities to channels connected to adjacent touch driving electrodes or channels connected to adjacent touch sensing electrodes during a first frame, and when an abnormal touch situation is determined by the control unit, the first driving unit and the second driving unit are driven in the second self-sensing mode and supply touch driving signals with one polarity to channels connected to one or more touch driving electrodes or channels connected to one or more touch sensing electrodes during the first frame.

Advantageous Effects

According to the present invention, a touch sensing device and a touch sensing method can prevent malfunctions of a touch display device and the touch sensing device due to a touch input by a conductive material such as water or a coin that is not intended by a user.

According to the present invention, the touch sensing device and the touch sensing method can be driven in different driving modes according to a touch situation to receive more accurately a touch input for each touch situation.

DESCRIPTION OF DRAWINGS

FIG. 1 is a diagram illustrating a display system to which a touch sensing device is applied according to one embodiment of the present invention.

FIG. 2 is a diagram illustrating signals transmitted and received between the touch sensing device and a touch screen panel according to a mutual capacitance scheme.

FIG. 3 is a diagram illustrating signals transmitted and received between the touch sensing device and a touch screen panel according to a self-capacitance scheme.

FIG. 4 is a schematic block diagram illustrating a configuration of the touch sensing device shown in FIGS. 1 to 3.

FIG. 5 is a diagram illustrating a first touch driving signal and a second touch driving signal transmitted in a first self-sensing mode according to one embodiment of the present invention.

FIG. 6A is a diagram illustrating a first touch driving signal and a second touch driving signal transmitted in a second self-sensing mode according to one embodiment of the present invention.

FIG. 6B is a diagram illustrating a first touch driving signal and a second touch driving signal transmitted in the second self-sensing mode according to another embodiment of the present invention.

FIG. 7A is a diagram illustrating a mutual sensing signal generated when an abnormal touch caused by water occurs.

FIG. 7B is a diagram illustrating a mutual sensing signal generated when an abnormal touch caused by a coin occurs.

FIG. 8 is a diagram showing intensity distributions of mutual sensing signals generated by a hand of a user, water, and a coin.

FIG. 9A is a diagram illustrating an example of a first self-sensing signal generated in the first self-sensing mode according to one embodiment of the present invention when a normal touch caused by the user occurs.

FIG. 9B is a diagram illustrating an example of a second self-sensing signal generated in the second self-sensing mode according to one embodiment of the present invention when the normal touch caused by the user occurs.

FIG. 9C is a diagram illustrating an example of the first self-sensing signal generated in the first self-sensing mode according to one embodiment of the present invention when the abnormal touch caused by water occurs.

FIG. 9D is a diagram illustrating an example of a second self-sensing signal generated in the second self-sensing mode according to one embodiment of the present invention when a normal touch caused by water occurs.

FIG. 10 is a flowchart illustrating a touch sensing method according to one embodiment of the present invention.

MODES OF THE INVENTION

Throughout the present specification, the same reference numerals indicate substantially the same components. In the following description, when not related to the core configuration of the present invention, detailed descriptions of configurations and functions known in the technical field of the present invention may be omitted. The meaning of terms used herein should be understood as follows.

Advantages and features of the present invention and methods for achieving them will be made clear from embodiments described in detail below with reference to the accompanying drawings. However, the present invention may be implemented in many different forms and should not be construed as being limited to the embodiments set forth herein, and the embodiments are provided such that this disclosure will be thorough and complete and will fully convey the scope of the present invention to those skilled in the art to which the present invention pertains, and the present invention is defined by only the scope of the appended claims.

Shapes, sizes, ratios, angles, numbers, and the like disclosed in the drawings for describing the embodiments of the present invention are illustrative, and thus the present invention is not limited to the illustrated matters. The same reference numerals refer to the same components throughout the present specification. Further, in the following description of the present invention, when a detailed description of a known related art is determined to unnecessarily obscure the gist of the present invention, the detailed description thereof will be omitted herein.

When terms "include," "have," "consist of," and the like mentioned in the present specification are used, other parts may be added unless a term "only" is used herein. When a component is expressed as a singular number, the plural number is included unless otherwise specified.

In analyzing a component, it is interpreted as including an error range even when there is no explicit description.

In describing a temporal relationship, for example, when a temporal predecessor relationship is described as being "after," "subsequent," "next to," "prior to," or the like, unless "immediately" or "directly" is not used, cases that are not continuous may also be include.

Although the terms first, second, and the like are used to describe various components, these components are not substantially limited by these terms. These terms are used only to distinguish one component from another component. Therefore, a first component described below may be substantially a second component within the technical spirit of the present invention.

The term "at least one" should be understood to include all possible combinations from one or more related items. For example, "at least one of first, second, and third items" means each of the first, second, and third items, as well as a combination of all items that can be presented from two or more of the first, second, and third items.

Features of various embodiments of the present invention may be partially or entirely coupled or combined with each other and may be technically various interlocking and driving, and the embodiments may be independently implemented with respect to each other or implemented together with a correlation.

Hereinafter, exemplary embodiments of the present invention will be described in detail with reference to the accompanying drawings.

FIG. 1 is a diagram illustrating a display system to which a touch sensing device is applied according to one embodiment of the present invention.

As shown in FIG. 1, a display system 100 includes a display panel 110, a gate driving unit 120, a data driving unit 130, a timing controller 140, a host system 150, a touch screen panel TSP, and a touch sensing device 160.

The display panel 110 includes a plurality of gate lines G1 to Gn and a plurality of data lines D1 to Dm, which are disposed to intersect each other and define a plurality of pixel regions, and pixels P provided in the plurality of pixel regions. The plurality of gate lines G1 to Gn may extend in a horizontal direction and the plurality of data lines D1 to Dm may extend in a vertical direction, but the present invention is not necessarily limited thereto.

In one example, the display panel 110 may be a liquid crystal display (LCD) panel. When the display panel 110 is an LCD panel, the display panel 110 includes thin-film transistors TFT and liquid crystal cells connected to the thin-film transistors TFT, which are formed in the pixel regions defined by the plurality of gate lines G1 to Gn and the plurality of data lines D1 to Dm.

The thin-film transistors TFT respond to scan pulses supplied through the gate lines G1 to Gn to supply source signals supplied through the data lines D1 to Dm to the liquid crystal cells.

Since the liquid crystal cell includes a common electrode and a subpixel electrode connected to the thin-film transistor TFT, which face each other with a liquid crystal interposed therebetween, the liquid crystal cell may be equivalently expressed as a liquid crystal capacitor Clc. The liquid crystal cell includes a storage capacitor Cst connected to a gate line of a previous stage to maintain a voltage corresponding to the source signal charged in the liquid crystal capacitor Clc until a voltage corresponding to a next source signal is charged.

Meanwhile, the pixel region of the display panel 110 may include red (R), green (G), blue (B), and white (W) subpixels. In one example, the subpixels may be formed repeatedly in a row direction or may be formed in a **2*2** matrix. In this case, a color filter corresponding to each color is disposed in each of the red (R), green (G), and blue (B) subpixels, whereas, a separate color filter is not disposed in the white (W) subpixel. In one example, the red (R), green (G), blue (B), and white (W) subpixels may be formed to have the same area ratio, and alternatively, the red (R), green (G), blue (B), and white (W) subpixels may be formed to have different area ratios.

In the above-described example, the display panel 110 is described as the LCD panel, but in another example, the display panel 110 may be an organic light-emitting display (OLED) panel.

The gate driving unit 120 includes a shift register which sequentially generates a scan pulse, that is, a gate high pulse, in response to a gate control signal GCS from the timing controller 140. In response to the scan pulse, the thin-film transistor TFT is turned on.

As shown in the drawings, the gate driving unit 120 may be disposed on one side of the display panel 110, for example, on a left side, but in some cases, the gate driving unit 120 may be disposed on one side and the other side of the display panel 110 opposite to each other, for example, on both left and right sides. The gate driving unit 120 may include a plurality of gate driver integrated circuits (ICs) (not shown). The gate driving unit 120 may be in the form of a tape carrier package on which the gate driver ICs are mounted, but the present invention is not necessarily limited thereto, and the gate driver ICs may be mounted directly on the display panel 110.

The data driving unit 130 converts a digital image signal RGB', which is transmitted from the timing controller 140, into an analog source signal and outputs the analog source signal to the display panel 110. Specifically, the data driving unit 130 outputs the analog source signal to the data lines D1 to Dm in response to a data control signal DCS transmitted from the timing controller 140.

The data driving unit 130 may be disposed on one side of the display panel 110, for example, on an upper side, but in some cases, the data driving unit 130 may be disposed on one side and the other side of the display panel 110 opposite to each other, for example, on both upper and lower sides. In addition, the data driving unit 130 may be in the form of a tape carrier package on which source driver ICs are mounted, but the present invention is not necessarily limited thereto.

In one embodiment, the data driving unit 130 may include a plurality of source driver ICs (not shown) that convert a digital image signal transmitted from the timing controller 140 into an analog source signal and output the analog source signal to the display panel 110.

The timing controller 140 receives various timing signals including a vertical synchronization signal Vsync, a horizontal synchronization signal Hsync, a data enable (DE) signal, and a clock signal CLK from the host system 150 and generates a data control signal DCS for controlling the data driving unit 130 and a gate control signal GCS for controlling the gate driving unit 120. In addition, the timing controller 140 receives an image signal RGB from the host system 150 and converts the image signal RGB into the image signal RGB', which may be processed by the data driving unit 130, to output the image signal RGB'.

In one embodiment, the data control signal DCS may include a source start pulse SSP, a source sampling clock SSC, and a source output enable signal SOE, and the gate control signal GCS may include a gate start pulse GSP, a gate shift clock GSC, and a gate output enable signal GOE.

Here, the source start pulse controls data sampling start timings of the plurality of source drive ICs (not shown) constituting the data driving unit 130. The source sampling clock is a clock signal that controls a sampling timing of data in each source drive IC. The source output enable signal controls an output timing of each source drive IC.

The gate start pulse controls operation start timings of the plurality of gate drive ICs (not shown) constituting the gate driving unit 120. The gate shift clock is a clock signal commonly input to one or more gate drive ICs and controls a shift timing of the scan signal (gate pulse). The gate output enable signal specifies timing information of one or more gate drive ICs.

The host system 150 may be implemented as any one of a navigation system, a set-top box, a digital versatile disc (DVD) player, a blu-ray player, a personal computer (PC), a home theater system, a broadcast receiver, and a phone system. The host system 150 includes a system on chip (SoC) in which a scaler is embedded and converts a digital image signal RGB of an input image into a format suitable for display on the display panel 110. The host system 150 transmits the digital image signal RGB and the timing signals to the timing controller 140. In addition, the host system 150 analyzes touch coordinates input from the touch sensing device 160 and outputs the touch coordinates in the form of a line on the display panel 110 or executes an application program linked with coordinates where a touch occurs by the user.

The touch screen panel TSP receives a touch input by the user, and the touch screen panel TSP may be implemented in the form of being embedded in the display panel 110. For example, the touch screen panel TSP may be disposed in the display panel 110 in the form of an on-cell type or in-cell type panel.

The touch sensing device 160 senses a touch occurring on the touch screen panel TSP. The touch sensing device 160 may drive the touch screen panel TSP according to the mutual capacitance scheme and the self-capacitance scheme to determine whether a touch occurs and calculate touch coordinates.

Hereinafter, the touch sensing device according to one embodiment of the present invention will be described in detail with reference to FIGS. 2 to 9D.

FIG. 2 is a diagram illustrating signals transmitted and received between the touch sensing device and a touch screen panel according to a mutual capacitance scheme, and FIG. 3 is a diagram illustrating signals transmitted and received between the touch sensing device and a touch screen panel according to a self-capacitance scheme. FIG. 4 is a schematic block diagram illustrating a configuration of the touch sensing device shown in FIGS. 1 to 3. FIG. 5 is a diagram illustrating a first touch driving signal and a second touch driving signal transmitted in a first self-sensing mode according to one embodiment of the present invention. FIG. 6A is a diagram illustrating a first touch driving signal and a second touch driving signal transmitted in a second self-sensing mode according to one embodiment of the present invention, and FIG. 6B is a diagram illustrating a first touch driving signal and a second touch driving signal transmitted in the second self-sensing mode according to another embodiment of the present invention. FIG. 7A is a diagram illustrating a mutual sensing signal generated when an abnormal touch caused by water occurs. FIG. 7B is a diagram illustrating a mutual sensing signal generated when an abnormal touch caused by a coin occurs. FIG. 8 is a diagram showing intensity distributions of mutual sensing signals generated by a hand of a user, water, and a coin. FIG. 9A is a diagram illustrating an example of a first self-sensing signal generated in the first self-sensing mode according to one embodiment of the present invention when a normal touch caused by the user occurs. FIG. 9B is a diagram illustrating an example of a second self-sensing signal generated in the second self-sensing mode according to one embodiment of the present invention when the normal touch caused by the user occurs. FIG. 9C is a diagram illustrating an example of the first self-sensing signal generated in the first self-sensing mode according to one embodiment of the present invention when the abnormal touch caused by water occurs. FIG. 9D is a diagram illustrating an example of a second self-sensing signal generated in the second self-sensing mode according to one embodiment of the present invention when a normal touch caused by water occurs.

As shown in FIGS. 2 and 3, the touch screen panel TSP may include touch driving electrodes TXE extending in a first direction X and touch sensing electrodes RXE extending in a second direction Y perpendicular to the first direction X. In this case, the plurality of touch driving electrodes TXE and the plurality of touch sensing electrodes RXE may be disposed to intersect and overlap each other.

The touch sensing device 160 receives a touch occurring on the touch screen panel TSP. The touch sensing device 160 may be driven according to the mutual capacitance scheme and the self-capacitance scheme to calculate touch coordinates. Specifically, as shown in FIG. 2, the touch sensing device 160 may be driven in a mutual sensing mode MSM according to the mutual capacitance scheme, supply touch driving signals TXS to the touch driving electrodes TXE, and receive mutual sensing signals RXS_M from the touch sensing electrodes RXE coupled to the touch driving electrodes TXE. In addition, the touch sensing device 160 is driven in a first self-sensing mode SSM1 or a second self-sensing mode SSM2 according to the self-capacitance scheme, and as shown in FIG. 3, the touch sensing device 160 may supply the touch driving signals TXS to the touch driving electrodes TXE and the touch sensing electrodes RXE and receive a self-sensing signal RXS_S for each supplied touch driving signal TXS.

According to one embodiment of the present invention, the touch sensing device 160 may be driven using different driving modes according to a touch situation. Specifically, in a normal touch situation, the touch sensing device 160 may be driven in the mutual sensing mode MSM and the first self-sensing mode SSM1, and in an abnormal touch situation, the touch sensing device 160 may be driven in the mutual sensing mode MSM and the second self-sensing mode SSM2.

The touch sensing device 160 may calculate touch coordinates using at least one of the mutual sensing signal RXS_M input in the mutual sensing mode MSM, a first self-sensing signal RXS_S1 input in the first self-sensing mode SSM1, and a second self-sensing signal RXS_S2 input in the second self-sensing mode SSM2.

As shown in FIG. 4, the touch sensing device 160 includes a first driving unit 220, a second driving unit 230, and a control unit 210.

The first driving unit 220 supplies the touch driving signal TXS to the touch driving electrode TXE in the mutual sensing mode MSM and supplies the touch driving signal TXS to the touch driving electrode TXE in the first self-sensing mode SSM1 and the second self-sensing mode SSM2 to receive the self-sensing signal RXS_S for the supplied touch driving signal TXS. Although not shown in the drawing, the first driving unit 220 includes channels connected to the touch driving electrodes TXE. That is, the touch driving signal TXS is transmitted to the touch driving electrode TXE through each channel, and the self-sensing signal RXS_S is received from the touch driving electrode TXE through each channel.

According to one embodiment of the present invention, in the first self-sensing mode SSM1, the first driving unit 220 supplies touch driving signals TXS with different polarities to adjacent touch driving electrodes TXE at the same timing. Specifically, during a first frame 1Frame, the first driving unit 220 may supply first touch driving signals TXS1 to odd-numbered touch driving electrodes TXE(2$n$−1) (n is an integer) through channels connected to the odd-numbered touch driving electrodes TXE(2$n$−1) and, simultaneously, supply second touch driving signals TXS2, which have polarities different from those of the first touch driving signals, to even-numbered touch driving electrodes TXE(2$n$) through channels connected to the even-numbered touch driving electrodes TXE(2$n$). In addition, during a second frame 2Frame, the first driving unit 220 may be driven as in the first frame 1Frame. That is, during the second frame 2Frame, the first driving unit 220 may supply the first touch driving signals TXS1 to the odd-numbered touch driving electrodes TXE(2$n$−1) through the channels connected to the odd-numbered touch driving electrodes TXE(2$n$−1) and, simultaneously, supply the second touch driving signals TXS2, which have polarities different from those of the first touch driving signals TXS1, to the even-numbered touch driving electrodes TXE(2$n$) through the channels connected to the even-numbered touch driving electrodes TXE(2$n$). In this case, the first touch driving signal TXS1 and the second touch driving signal TXS2 may have opposite polarities. That is, the first touch driving signal TXS1 and the second touch driving signal TXS2 may have the same amplitude and cycle and have a phase difference of 180 degrees. For example, in the first self-sensing mode SSM1, the first driving unit 220 may output the first touch driving signals TXS1 with positive polarities P to a first touch driving electrode TXE1 and a third touch driving electrode TXE3 through channels connected to the touch driving electrodes during the first frame 1Frame and the second frame 2Frame and output second touch driving signals TXS2 with negative polarities N to a second touch driving electrode TXE2 and a fourth touch driving electrode TXE4 through channels connected to the touch driving electrodes during the first frame 1Frame and the second frame 2Frame.

According to one embodiment of the present invention, in the second self-sensing mode SSM2, the first driving unit 220 supplies driving signals with one polarity at the same timing. Specifically, during the first frame 1 Frame, the first driving unit 220 supplies the first touch driving signal TXS1 to at least one of the touch driving electrodes TXE. For example, in the second self-sensing mode SSM2, the first driving unit 220 outputs first touch driving signals TXS1 with positive polarities P to all the touch driving electrodes TXE1 to TXE4 through the channels connected to all the touch driving electrodes TXE1 to TXE4 and outputs second touch driving signals TXS2 with negative polarities N to all the touch driving electrodes TXE1 to TXE4 through the channels connected to all the touch driving electrodes TXE1 to TXE4 during the second frame 2Frame. However, the present invention is not limited thereto, and in the second self-sensing mode SSM2, the first driving unit 220 may group at least one channel corresponding to at least one touch driving electrode and output driving signals with the same polarity or different polarities to the touch driving electrodes connected to the channels through the channels included in each group.

The second driving unit 230 receives the mutual sensing signal RXS_M generated in response to the touch driving signal TXS supplied to the touch driving electrode TXE in the mutual sensing mode MSM and supplies the touch driving signal TXS to the touch sensing electrode RXE in the self-sensing mode SSM1 and the second self-sensing mode SSM2 to receive the self-sensing signal RXS_S for the supplied touch driving signal TXS. The second driving unit 230 includes channels CH1 to CH4 connected to the touch sensing electrodes RXE. That is, the touch driving signals TXS are transmitted to the touch driving electrodes TXE through the channels, and the mutual sensing signals RXS_M and the self-sensing signal RXS_S are received from the touch sensing electrodes RXE through the channels.

According to one embodiment of the present invention, as shown in FIG. 5, in the first self-sensing mode SSM1, the second driving unit 230 supplies touch driving signals TXS with different polarities to adjacent touch sensing electrodes RXE at the same timing. However, the present invention is not limited thereto, and the second driving unit 230 may supply the touch driving signals TXS with different polarities to the adjacent touch driving electrodes TXE at the same timing. Specifically, during the first frame 1Frame, the second driving unit 230 supplies the first touch driving signals TXS1 to odd-numbered touch sensing electrodes RXE(2$n$−1) through channel connected to the odd-numbered touch sensing electrodes RXE(2$n$−1) and, simultaneously, the second driving unit 230 supplies the second touch driving signals TXS2 with polarities different from those of the first touch driving signals TXS1 to even-numbered touch sensing electrodes RXE(2$n$) through channels connected to the even-numbered touch sensing electrodes RXE(2$n$). In addition, during the second frame 2Frame, the second driving unit 230 may be driven as in the first frame 1Frame. That is, during the second frame 2Frame, the second driving unit 230 may supply the first touch driving signals TXS1 to the odd-numbered touch sensing electrodes RXE(2$n$−1) through the channels connected to the odd-numbered touch sensing electrodes RXE(2$n$−1) and, simultaneously, supply the second touch driving signals TXS2, which have polarities different from those of the first touch driving signals TXS1, to the even-numbered touch sensing electrodes RXE(2$n$) through the channels connected to the even-numbered touch sensing electrodes RXE(2$n$). In this case, the first touch driving signal TXS1 and the second touch driving signal TXS2 may have opposite polarities. That is, the first touch driving signal TXS1 and the second touch driving signal TXS2 may have the same amplitude and cycle and have a phase difference of 180 degrees. For example, as shown in FIG. 5, in the first self-sensing mode SSM1, the second driving unit 230 may output the first touch driving signals TXS1 with positive polarities P to a first touch sensing electrode RXE1 and a third touch sensing electrode RXE3 through a first channel CH1 and a third channel CH3 connected to the first and third touch sensing electrodes RXE1 and RXE3, respectively, during the first frame 1Frame and the second frame 2Frame and output the second touch driving signals TXS2 with negative polarities N to a second touch sensing electrode RXE2 and a fourth touch sensing electrode RXE4 through a second channel CH2 and a fourth channel CH4 connected to the second and fourth touch sensing electrodes RXE2 and RXE4, respectively, during the first frame 1Frame and the second frame 2Frame.

According to one embodiment of the present invention, as shown in FIGS. 6A and 6B, in the second self-sensing mode SSM2, the second driving unit 230 supplies driving signals with one polarity at the same timing. Specifically, in the second self-sensing mode SSM2, the second driving unit 230 supplies the first touch driving signal TXS1 to at least one touch sensing electrode RXE through channels connected to one or more touch sensing electrodes RXE during the first frame 1Frame. For example, as shown in FIG. 6A, in the second self-sensing mode SSM2, the second driving unit 230 may output the first touch driving signals TXS1 with positive polarities P to all the touch sensing electrodes RXE1 to RXE4 through all the channels CH1 to CH4 connected to all the touch sensing electrodes RXE1 to RXE4 during the first frame 1 Frame and output the second touch driving signals TXS2 with negative polarities N to all the touch sensing electrodes RXE1 to RXE4 through all the channels CH1 to CH4 connected to all the touch sensing electrodes RXE1 to RXE4 during the second frame 2Frame. However, the present invention is not limited thereto, and in the second self-sensing mode SSM2, the first touch driving signal TXS1 and the second touch driving signal TXS2 may have the same polarity and the same phase. Alternatively, as shown in FIG. 6B, in the second self-sensing mode SSM2, the second driving unit 230 may output the first touch driving signals TXS1 with positive polarities P to the first and third touch sensing electrodes RXE1 and RXE3 through the first and third channels CH1 and CH3 connected to the first and third touch sensing electrodes RXE1 and RXE3 during the first frame 1Frame and output the second touch driving signals TXS2 with negative polarities N to the second and fourth touch sensing electrodes RXE2 and RXE4 through the second and fourth channels CH2 and CH4 connected to the second and fourth touch sensing electrodes RXE2 and RXE4 during the second frame 2Frame. In the second self-sensing mode SSM2, the first touch driving signal TXS1 and the second touch driving signal TXS2 may have the same polarity and the same phase and may have the same amplitude and cycle and a phase difference of 180 degrees. However, the present invention is not limited thereto, and in the second self-sensing mode SSM2, the second driving unit 230 may group at least one channel corresponding to at least one touch sensing electrode and output driving signals with the same polarity or different polarities to the touch sensing electrodes connected to the channels through the channels included in each group.

According to one embodiment of the present invention, when the first driving unit 220 and the second driving unit 230 are driven in the first self-sensing mode SSM1 and thus the driving signal is supplied to the touch screen panel TSP, in a low ground mass (LGM) state in which the touch screen panel TSP is not connected to a ground, influence of a retransmission signal can be minimized and touch sensitivity can be improved. In addition, when the first driving unit 220 and the second driving unit 230 are driven in the second self-sensing mode SSM2 and thus the driving signal is supplied to the touch screen panel TSP, it is possible to prevent malfunctions of a touch display device and a touch sensing device due to a touch input caused by a conductive material such as water or a coin that a user does not intend.

The control unit 210 calculates touch coordinates using the mutual sensing signal RXS_M and the self-sensing signal RXS_S input to the first driving unit 220 and the second driving unit 230. In particular, according to one embodiment of the present invention, the control unit 210 determines a touch situation using the mutual sensing signal RXS_M input to the second driving unit 230, and according to the determined touch situation, the control unit 210 selects driving modes of the first driving unit 220 and the second driving unit 230. To this end, the control unit 210 includes a driving mode determination unit 211, a touch coordinate calculation unit 212, and a touch controller 213.

The driving mode determination unit 211 determines a normal touch situation by the user or an abnormal touch situation due to an unintended cause such as water or a coin other than the user using the mutual sensing signal RXS_M input to the second driving unit 230. In this case, as shown in FIGS. 7A and 7B, the mutual sensing signal RXS_M may be a sensing signal for each sensing region of a matrix structure formed such that the touch driving electrode TXE and the touch sensing electrode RXE intersect.

The driving mode determination unit 211 determines a touch situation using at least one of an area of touch regions generated by mutual sensing signals RXS_M having values that are greater than or equal to a first threshold value CV1, a ratio of the number of mutual sensing signals RXS_M having a positive (+) value to the number of mutual sensing signals RXS_M having a negative (−) value, and the number of mutual sensing signals RXS_M having values that are greater than or equal to a second threshold value CV2.

In an abnormal touch situation due to an unintended cause such as water or a coin, as shown in FIGS. 7 and 8, the mutual sensing signals RXS_M having the values that are greater than or equal to the first threshold value CV1 may be input to a large area of the touch screen panel TSP. Thus, the driving mode determination unit 211 may determine the touch situation using the area of the rectangular-shaped touch regions with a minimum area, which corresponds to the mutual sensing signals RXS_M having the values that are greater than or equal to the first threshold value CV1 in the touch screen panel TSP. Specifically, the driving mode determination unit 211 may define rectangular-shaped touch regions with a minimum area, which corresponds to the mutual sensing signals RXS_M having the values that are greater than or equal to the first threshold value CV1 in the touch screen panel TSP and calculate an area for the touch region, and when the calculated area of the touch region is greater than or equal to a threshold area, the driving mode determination unit 211 may determine that a touch situation is an abnormal touch situation. For example, as shown in FIGS. 7A and 7B, the driving mode determination unit 211 may define touch regions TA1 and TA2 with a minimum area, which include mutual sensing signals RXS_M having absolute values of 10 or more, which is the first threshold value CV1, and calculate an area of the touch regions TA1 and TA2. In this case, when the calculated area of the touch regions TA1 and TA2 is greater than the threshold area, the driving mode determination unit 211 may determine that a touch situation is an abnormal touch situation.

In the abnormal touch situation due to an unintended cause such as water or a coin, as shown in FIG. 8, the ratio of the number of mutual sensing signals RXS_M having a positive (+) value to the number of mutual sensing signals RXS_M having a negative (−) value may have a value that is greater than a ratio of the number of mutual sensing signals RXS_M having a positive (+) value to the number of mutual sensing signals RXS_M having a negative (−) value in a normal touch situation by the user. Thus, the driving mode determination unit 211 may determine a touch situation using the ratio of the number of mutual sensing signals RXS_M having a positive (+) value to the number of mutual sensing signals RXS_M having a negative (−) value. Specifically, the driving mode determination unit 211 may calculate the ratio of the number of mutual sensing signals RXS_M having a positive (+) value to the number of mutual sensing signals RXS_M having a negative (−) value, and when the calculated ratio is less than a threshold ratio, the driving mode determination unit 211 may determine that a touch situation is an abnormal touch situation, and when the ratio of the number of mutual sensing signals RXS_M having a positive (+) value to the number of mutual sensing signals RXS_M having a negative (−) value is greater than or equal to the threshold ratio, the driving mode determination unit 211 may determine that the touch situation is a normal touch situation.

As shown in FIG. 8, in the abnormal touch situation due to an unintended cause such as water or a coin, a mutual sensing signal RXS having a value that is greater than or equal to the second threshold value CV2 may be generated as a threshold number or less, and in the normal touch situation by the user, the mutual sensing signal RXS having the value that is greater than or equal to the second threshold value CV2 may be generated as the threshold number or more. Thus, the driving mode determination unit 211 may calculate the number of mutual sensing signals RXS_M having values that are greater than or equal to the second threshold value CV2, then when the calculated number is less than the threshold number, the driving mode determination unit 211 may determine that the touch situation is an abnormal touch situation, and when the number of mutual sensing signals RXS_M having values that are greater than or equal to the second threshold value CV2, the driving mode determination unit 211 may determine that the touch situation is a normal touch situation.

In addition, the driving mode determination unit 211 may determine to drive the first driving unit 220 and the second driving unit 230 in the first self-sensing mode SSM1 or the second self-sensing mode SSM2 according to the determined touch situation. Specifically, when a normal touch situation is determined, the driving mode determination unit 211 may determine to drive the first driving unit 220 and the second driving unit 230 in the first self-sensing mode SSM1, and when an abnormal touch situation is determined, the driving mode determination unit 211 may determine to drive the first driving unit 220 and the second driving unit 230 in the second self-sensing mode SSM2.

According to one embodiment of the present invention, the driving mode determination unit 211 determines a touch situation using at least one of an area of rectangular-shaped touch regions with a minimum area corresponds to the mutual sensing signals RXS_M having values that are greater than or equal to the first threshold value CV1 in the touch screen panel TSP, a ratio of the number of mutual sensing signals RXS_M having a positive (+) value to the number of mutual sensing signals RXS_M having a negative (−) value, and the number of mutual sensing signals RXS_M having values that are greater than or equal to the second threshold value CV2 and determines driving modes of the first driving unit 220 and the second driving unit 230 according to the touch situation. Thus, as shown in FIGS. 9A to 9D, it is possible to prevent even a touch due to an unintended cause such as water or a coin other than the user from being input as a normal touch, and the normal touch due to the user can be input more accurately. Specifically, when the touch sensing device 160 is driven according to the first self-sensing mode SSM1 in a normal touch situation due to the user, the first self-sensing signal RXS_S1 having the second threshold value CV2 or more is mainly generated in the touched region, whereas, when the touch sensing device 160 is driven according to the second self-sensing mode SSM2, the second self-sensing signal RXS_S2 having the second threshold value CV2 is generated not only in the touched region but also in a non-touched region. That is, in the normal touch situation due to the user, when the touch sensing device 160 is driven in the first self-sensing mode SSM1, a touch may be recognized more accurately than when the touch sensing device 160 is driven in the second self-sensing mode SSM2. In addition, when the touch sensing device 160 is driven according to the first self-sensing mode SSM1 in an abnormal touch due to water, the first self-sensing signal RXS_S1 having the second threshold value CV2 or more is generated and thus the abnormal touch due to water may be recognized as a normal touch, whereas, when the touch sensing device 160 is driven according to the second self-sensing mode SSM2, the second self-sensing signal RXS_S2 having the second threshold value CV2 or more is not generated and thus the abnormal touch due to water may not be recognized. That is, in the abnormal touch situation due to water, when the touch sensing device 160 is driven in the second self-sensing mode SSM2, an abnormal touch may be recognized more accurately than when the touch sensing device 160 is driven in the first self-sensing mode SSM1.

In the normal touch situation, as shown in FIG. 9A, the first self-sensing signal RXS_S1 input according to the first self-sensing mode SSM1 has a value that is greater than or equal to the second threshold value CV2 at a position corresponding to a touched region in which a noise by a retransmission signal, particularly, in an LGM state, is minimized so that touch input accuracy can be improved. On the other hand, as shown in FIG. 9B, the second self-sensing signal RXS_S2 input according to the second self-sensing mode SSM2 has a value that is greater than or equal to the second threshold value CV2 at even a position corresponding to a non-touched region due to a noise by a retransmission signal, particularly, in the LGM state, so that the touch input accuracy may be degraded. As shown in FIG. 9C, in the abnormal touch situation due to water, the first self-sensing signal RXS_S1 input according to the first self-sensing mode SSM1 has a value that is greater than or equal to the second threshold value CV2 in a non-touched region so that the touch input accuracy may be degraded. On the other hand, in the second self-sensing signal RXS_S2 input according to the second self-sensing mode SSM2, the abnormal touch due to water is not input as a value that is greater than or equal to the second threshold value CV2 so that the touch input accuracy can be improved. Therefore, the driving mode determination unit 211 according to one embodiment of the present invention drives the first driving unit 220 and the second driving unit 230 in the first self-sensing mode SSM1 in the normal touch situation and drives the first driving unit 220 and the second driving unit 230 in the second self-sensing mode SSM2 in the abnormal touch situation so that the touch input accuracy can be improved according to the touch situation.

Referring to FIG. 4 again, the touch coordinate calculation unit 212 receives at least one of the input mutual sensing signals RXS_M, the first self-sensing signal RXS_S1, and the second self-sensing signals RXS_S2 from the first driving unit 220 and the second driving unit 230 and generates touch coordinates on the basis of at least one of the received input mutual sensing signals RXS_M, the received first self-sensing signal RXS_S1, and the received second self-sensing signals RXS_S2.

When a normal touch situation is determined, the touch coordinate calculation unit 212 is driven in the first self-sensing mode SSM1, receives the input first self-sensing signals RXS_S1 through the first driving unit 220 and the second driving unit 230, and calculates touch coordinates on the basis of at least one of the mutual sensing signal RXS_M and the first self-sensing signal RXS_S1. When an abnormal touch situation is determined, the touch coordinate calculation unit 212 is driven in the second self-sensing mode SSM2, receives the input second self-sensing signals RXS_S2 through the first driving unit 220 and the second driving unit 230, and calculates touch coordinates on the basis of at least one of the mutual sensing signal RXS_M and the second self-sensing signal RXS_S2.

The touch controller 213 may generate timing control signals for controlling driving and sensing timings of the first driving unit 220 and the second driving unit 230.

Hereinafter, a touch sensing method according to one embodiment of the present invention will be described in detail with reference to FIG. 10.

FIG. 10 is a flowchart illustrating the touch sensing method according to one embodiment of the present invention.

Referring to FIG. 10, the touch sensing device 160 is driven in the mutual sensing mode MSM and the first self-sensing mode SSM1 (S1011). According to one embodiment of the present invention, the touch sensing device 160 is driven in the mutual sensing mode MSM according to a mutual capacitance scheme and the first self-sensing mode SSM1 according to a self-capacitance scheme. In this case, the touch sensing device 160 may be driven simultaneously in the mutual sensing mode MSM and the first self-sensing mode SSM1. However, the present invention is not limited thereto, and the touch sensing device 160 may be driven in the mutual sensing mode MSM and the first self-sensing mode SSM1, respectively, during separate periods.

According to one embodiment of the present invention, in the first self-sensing mode SSM1, the touch sensing device 160 supplies touch driving signals TXS with different polarities to adjacent touch driving electrodes TXE at the same timing. Specifically, during the first frame 1Frame, the touch sensing device 160 supplies first touch driving signals TXS1 to the odd-numbered touch driving electrodes TXE(2*n*−1) or the odd-numbered touch sensing electrodes RXE(2*n*−1) through the channels connected to the odd-numbered touch driving electrodes TXE(2*n*−1) or the odd-numbered touch sensing electrodes RXE(2*n*−1) and, simultaneously, supplies second touch driving signals TXS2 with different polarities to the even-numbered touch driving electrodes TXE(2*n*) or the even-numbered touch sensing electrodes RXE(2*n*) through the channels connected to the even-numbered touch driving electrodes TXE(2*n*) or the even-numbered touch sensing electrodes RXE(2*n*). In addition, as the same as during the first frame 1Frame, during the second frame 2Frame, the touch sensing device 160 may supply first touch driving signals TXS1 to the odd-numbered touch driving electrodes TXE(2*n*−1) or the odd-numbered touch sensing electrodes RXE(2*n*−1) through the channels connected to the odd-numbered touch driving electrodes TXE(2*n*−1) or the odd-numbered touch sensing electrodes RXE(2*n*−1) and, simultaneously, supply second touch driving signals TXS2 with different polarities to the even-numbered touch driving electrodes TXE(2*n*) or the even-numbered touch sensing electrodes RXE(2*n*) through the channels connected to the even-numbered touch driving electrodes TXE(2*n*) or the even-numbered touch sensing electrodes RXE(2*n*). In this case, the first touch driving signal TXS1 and the second touch driving signal TXS2 may have opposite polarities. That is, the first touch driving signal TXS1 and the second touch driving signal TXS2 may have the same amplitude and cycle and have a phase difference of 180 degrees.

Then, the touch sensing device 160 determines whether a touch situation is an abnormal touch situation using the mutual sensing signal RXS_M (S1021). The touch sensing device 160 determines a touch situation using at least one of an area of touch regions generated by mutual sensing signals RXS_M having values that are greater than or equal to a first threshold value CV1, a ratio of the mutual sensing signals RXS_M having a positive (+) value to the mutual sensing signals RXS_M having a negative (−) value, and the number of mutual sensing signals RXS_M having values that are greater than or equal to a second threshold value CV2.

Specifically, the touch sensing device 160 may define rectangular-shaped touch regions with a minimum area, which corresponds to the mutual sensing signals RXS_M having the values that are greater than or equal to the first threshold value CV1 in the touch screen panel TSP and calculate an area for the touch region, and when the calculated area of the touch region is greater than or equal to a threshold area, the driving mode determination unit 211 may determine that a current situation is an abnormal touch situation. Alternatively, the touch sensing device 160 may calculate a ratio of the number of mutual sensing signals RXS_M having a positive (+) value to the number of mutual sensing signals RXS_M having a negative (−) value, compare the calculated ratio with a threshold ratio, and when the ratio of the number of mutual sensing signals RXS_M having a positive (+) value to the number of mutual sensing signals RXS_M having a negative (−) value is less than the threshold ratio, the touch sensing device 160 may determine that a touch situation is an abnormal touch situation. Alternatively, the touch sensing device 160 may calculate the number of mutual sensing signals RXS_M having values that are greater than or equal to the second threshold value CV2, and when the calculated number is less than the threshold number, the touch sensing device 160 may determine that the touch situation is an abnormal touch situation.

When the normal touch is determined, the touch sensing device 160 receives the first self-sensing signal RXS_S1 (S1022).

When the abnormal touch situation is determined, the touch sensing device 160 is driven in the mutual sensing mode MSM and the second self-sensing mode SSM2 (S1031).

In the second self-sensing mode SSM2, the touch sensing device 160 supplies driving signals with one polarity at the same timing. Specifically, during the first frame 1Frame, in the second self-sensing mode SSM2, the touch sensing device 160 supplies a first touch driving signal TXS1 to at least one touch driving electrode TXE or at least one touch sensing electrode RXE through channels connected to the one or more touch driving electrodes TXE or the one or more touch sensing electrodes RXE. For example, in the second self-sensing mode SSM2, the first driving unit 220 outputs first touch driving signals TXS1 with positive polarities P to all the touch driving electrodes TXE1 to TXE4 through channels connected to all the touch driving electrodes TXE1 to TXE4 and outputs second touch driving signals TXS2 with negative polarities N to all the touch driving electrodes TXE1 to TXE4 through channels connected to all the touch driving electrodes TXE1 to TXE4 during the second frame 2Frame. Alternatively, in the second self-sensing mode SSM2, the second driving unit 230 may output the first touch driving signals TXS1 with positive polarities P to the first and third touch sensing electrodes RXE1 and RXE3 through the first and third channels CH1 and CH3 connected to the first and third touch sensing electrodes RXE1 and RXE3 during the first frame 1Frame and output the second touch driving signals TXS2 with negative polarities N to the second and fourth touch sensing electrodes RXE2 and RXE4 through the second and fourth channels CH2 and CH4 connected to the second and fourth touch sensing electrodes RXE2 and RXE4 during the second frame 2Frame.

In the abnormal touch situation, the touch sensing device 160 receives the second self-sensing signal RXS_S2 (S1032).

Then, the touch sensing device 160 calculates touch coordinates on the basis of any one of the received mutual sensing signal RXS_M, the received first self-sensing signal RXS_S1, and the received second self-sensing signal RXS_S2 (S1041).

Thereafter, the touch sensing device 160 outputs the calculated touch coordinates to the host system (S1051).

It will be apparent to those skilled in the art that various changes and modifications may be made without departing from the spirit and scope of the present invention.

In addition, at least a part of the methods described herein may be implemented using one or more computer programs or components. These components may be provided as a series of computer instructions through a computer-readable medium or a machine-readable medium, which includes volatile and non-volatile memories. The instructions may be provided as software or firmware and may be entirely or partially implemented in a hardware configuration such as application specific integrated circuits (ASICs), field programmable gate arrays (FPGAs), digital signal processors (DSPs), or other similar devices. The instructions may be executed by one or more processors or other hardware components, and when one or more processors or other hardware components execute the series of computer instructions, one or more processors or other hardware components may entirely or partially perform the methods and procedures disclosed herein.

Therefore, it should be understood that the above-described embodiments are not restrictive but illustrative in all aspects. The scope of the present invention is defined by the appended claims rather than the detailed description, and it should be construed that all alternations or modifications derived from the meaning and scope of the appended claims and the equivalents thereof fall within the scope of the present invention.

The invention claimed is:

1. A touch sensing device, which drives a touch screen panel including a touch driving electrode extending in a first direction and a touch sensing electrode extending in a second direction perpendicular to the first direction, the touch sensing device comprising:

a first driver and a second driver which are driven in at least one of a mutual sensing mode, a first self-sensing mode, or a second self-sensing mode; and a controller configured to determine whether a touch situation is a normal touch situation or an abnormal touch situation on the basis of a mutual sensing signal input according to the mutual sensing mode and drive the first driver and the second driver in the first self-sensing mode or the second self-sensing mode, wherein, when the normal touch situation is determined by the controller, the first driver and the second driver are driven in the first self-sensing mode and supply touch driving signals with mutually different polarities to channels connected to adjacent touch driving electrodes or channels connected to adjacent touch sensing electrodes during a first frame, and when the abnormal touch situation is determined by the controller, the first driver and the second driver are driven in the second self-sensing mode and supply touch driving signals with same polarity to channels connected to one or more touch driving electrodes or channels connected to one or more touch sensing electrodes during the first frame.

2. The touch sensing device of claim 1, wherein, in the first self-sensing mode, the first and second drivers supply a first touch driving signals and second touch driving signals to adjacent first and second touch driving electrodes or first and second touch sensing electrodes, respectively, and the first touch driving signals and the second touch driving signals have a phase difference of 180 degrees.

3. The touch sensing device of claim 1, wherein:

in the first self-sensing mode, the first driver supplies first touch driving signals to odd-numbered touch driving electrodes through channels connected to the odd-numbered touch driving electrodes during the first frame and supplies second touch driving signals having mutually different polarities from the first touch driving signals to even-numbered touch driving electrodes through channels connected to the even-numbered touch driving electrodes during the first frame; and in the second self-sensing mode, the first driver supplies the first touch driving signals to at least one touch driving electrode through each channel connected to the one or more touch driving electrodes during the first frame.

4. The touch sensing device of claim 1, wherein:

in the first self-sensing mode, the second driver supplies first touch driving signals to odd-numbered touch sensing electrodes through channels connected to the odd-numbered touch sensing electrodes during the first frame and supplies second touch driving signals having mutually different polarities from the first touch driving signals to even-numbered touch sensing electrodes through channels connected to the even-numbered touch sensing electrodes during the first frame; and in the second self-sensing mode, the second driver supplies the first touch driving signals to at least one touch sensing electrode through each channel connected to the one or more touch sensing electrodes during the first frame.

5. The touch sensing device of claim 1, wherein the controller defines rectangular-shaped touch regions with a minimum area corresponding to mutual sensing signals having values greater than or equal to a first threshold value in the touch screen panel and calculates an area of the touch regions, and when the calculated area of the touch regions is greater than or equal to a threshold area, the abnormal touch situation is determined.

6. The touch sensing device of claim 1, wherein the controller calculates a ratio of the number of mutual sensing signals having a positive (+) value to the number of mutual sensing signals having a negative (−) value, and when the calculated ratio is less than a threshold ratio, the abnormal touch situation is determined.

7. The touch sensing device of claim 1, wherein the controller calculates the number of mutual sensing signals having values that are greater than or equal to a second threshold value, and when the calculated number is less than a threshold number, the abnormal touch situation is determined.

8. The touch sensing device of claim 1, wherein the controller calculates touch coordinates using at least one of the mutual sensing signal or a first self-sensing signal in the first self-sensing mode and calculates touch coordinates using at least one of the mutual sensing signal or a second self-sensing signal in the second self-sensing mode.

9. A touch sensing method, which drives a touch screen panel including a touch driving electrode extending in a first direction and a touch sensing electrode extending in a second direction perpendicular to the first direction, the touch sensing method comprising:

driving the touch screen panel in at least one of a mutual sensing mode or a first self-sensing mode;

determining an abnormal touch situation using a mutual sensing signal input according to the mutual sensing mode;

when a normal touch situation is determined, driving the touch screen panel in the first self-sensing mode to receive a first self-sensing signal, and calculating touch coordinates using the mutual sensing signal or the first self-sensing signal; and when the abnormal touch situation is determined, driving the touch screen panel in a second self-sensing mode to receive a second self-sensing signal, and calculating touch coordinates using the mutual sensing signal or the second self-sensing signal, wherein, in the first self-sensing mode, during a first frame, touch driving signals with mutually different polarities are output to channels connected to adjacent touch driving electrodes or channels connected to adjacent touch sensing electrodes at the same timing, and in the second self-sensing mode, touch driving signals with same polarity are output to channels connected to one or more touch driving electrodes or channels connected to one or more touch sensing electrodes during the first frame.

10. The touch sensing method of claim 9, wherein, in the first self-sensing mode, touch driving signals with a phase difference of 180 degrees are output to the adjacent touch driving electrodes at the same timing.

11. The touch sensing method of claim 9, wherein:

in the first self-sensing mode, first touch driving signals are supplied to odd-numbered touch driving electrodes through channels connected to the odd-numbered touch driving electrodes during the first frame, and second touch driving signals having mutually different polarities from the first touch driving signals are supplied to even-numbered touch driving electrodes through channels connected to the even-numbered touch driving electrodes during the first frame; and in the second self-sensing mode, the first touch driving signals are supplied to at least one touch driving electrode through each channel connected to the one or more touch driving electrodes during the first frame.

12. The touch sensing method of claim 9, wherein:

in the first self-sensing mode, first touch driving signals are supplied to odd-numbered touch sensing electrodes through channels connected to the odd-numbered touch sensing electrodes during the first frame, and second touch driving signals having mutually different polarities from the first touch driving signals are output to even-numbered touch sensing electrodes through channels connected to the even-numbered touch sensing electrodes during the first frame; and in the second self-sensing mode, the first touch driving signals are supplied to at least one touch sensing electrode through each channel connected to the one or more touch sensing electrodes during the first frame.

13. The touch sensing method of claim 9, wherein, in the determining of the abnormal touch situation using the mutual sensing signal input according to the mutual sensing mode, rectangular-shaped touch regions with a minimum area corresponding to mutual sensing signals having values greater than or equal to a first threshold value in the touch screen panel are defined, and an area of the touch regions is calculated, and when the calculated area of the touch regions is greater than or equal to a threshold area, the abnormal touch situation is determined.

14. The touch sensing method of claim 9, wherein, in the determining of the abnormal touch situation using the mutual sensing signal input according to the mutual sensing mode, a ratio of the number of mutual sensing signals having a positive (+) value to the number of mutual sensing signals having a negative (−) value is calculated, and when the calculated ratio is less than a threshold ratio, the abnormal touch situation is determined.

15. The touch sensing method of claim 9, wherein, in the determining of the abnormal touch situation using the mutual sensing signal input according to the mutual sensing mode, the number of mutual sensing signals having values that are greater than or equal to a second threshold value is calculated, and when the calculated number is less than a threshold number, the abnormal touch situation is determined.

* * * * *